(12) United States Patent
Ayala

(10) Patent No.: US 7,139,740 B2
(45) Date of Patent: Nov. 21, 2006

(54) SYSTEM AND METHOD FOR DEVELOPING ARTIFICIAL INTELLIGENCE

(76) Inventor: Francisco J. Ayala, 6715 Woodland Dr., Dallas, TX (US) 75225

( * ) Notice: Subject to any disclaimer, the term of this patent is extended or adjusted under 35 U.S.C. 154(b) by 0 days.

(21) Appl. No.: 10/755,946

(22) Filed: Jan. 13, 2004

(65) Prior Publication Data
US 2004/0143559 A1    Jul. 22, 2004

Related U.S. Application Data

(60) Provisional application No. 60/440,883, filed on Jan. 17, 2003.

(51) Int. Cl.
*G06F 15/18* (2006.01)
(52) U.S. Cl. .......................... 706/26; 706/13
(58) Field of Classification Search ............... 706/26, 706/13
See application file for complete search history.

(56) References Cited

U.S. PATENT DOCUMENTS

| | | |
|---|---|---|
| 4,979,126 A | 12/1990 | Pao et al. |
| 4,994,982 A | 2/1991 | Duranton et al. |
| 5,093,899 A | 3/1992 | Hiraiwa |
| 5,136,686 A | 8/1992 | Koza |
| 5,140,530 A | 8/1992 | Guha et al. |
| 5,214,746 A | 5/1993 | Fogel et al. |
| 5,245,696 A | 9/1993 | Stork et al. |
| 5,249,259 A | 9/1993 | Harvey |
| 5,283,855 A | 2/1994 | Motomura et al. |
| 5,349,646 A | 9/1994 | Furuta et al. |
| 5,375,250 A | 12/1994 | Van den Heuvel |
| 5,398,302 A | 3/1995 | Thrift |
| 5,400,436 A | 3/1995 | Nara et al. |
| 5,402,522 A | 3/1995 | Alkon et al. |
| 5,428,710 A | 6/1995 | Toomarian et al. |
| 5,452,402 A | 9/1995 | Sakiyama et al. |
| 5,455,891 A | 10/1995 | Hirotsu et al. |
| 5,459,817 A | 10/1995 | Shima |
| 5,515,477 A | 5/1996 | Sutherland |
| 5,566,273 A | 10/1996 | Huang et al. |

(Continued)

OTHER PUBLICATIONS

Kobayashi et al, "A New Indirect Encoding Method with Variable Length Gene Code to Optimize Neural Network Structures", IEEE, IJCNN, Jul. 1999.*

(Continued)

*Primary Examiner*—George Davis
(74) *Attorney, Agent, or Firm*—Gardere Wynne Sewell LLP

(57) ABSTRACT

In a method and system for developing a neural system adapted to perform a specified task, a population of neural systems is selected, each neural system comprising an array of interconnected neurons, and each neural system is encoded into a representative genome. For a given genome, a processing gene encodes a neural output function for each neuron, and the connections from each neuron are encoded by one or more connection genes, each connection gene including a weight function. The given neural system is operated to perform the specified task during a trial period, and performance is continually monitored during the trial period. Reinforcement signals determined from the continually monitored performance are applied as inputs to the functions respectively associated with each of the processing genes and connection genes of the given neural system. At the conclusion of the trial period, the fitness of the given neural system for performing the specified task is determined, usefully as a function of the reinforcement signals applied during the trial period. A set of genomes, respectively representing the neural systems of the population that have been determined to have the highest fitness values, are selected for use in forming a new generation of neural systems.

40 Claims, 11 Drawing Sheets

U.S. PATENT DOCUMENTS

| | | | |
|---|---|---|---|
| 5,568,590 | A | 10/1996 | Tolson |
| 5,617,483 | A | 4/1997 | Osawa |
| 5,633,988 | A | 5/1997 | Takatori et al. |
| 5,640,494 | A | 6/1997 | Jabri et al. |
| 5,704,016 | A | 12/1997 | Shigematsu et al. |
| 5,717,832 | A | 2/1998 | Steimle et al. |
| 5,720,002 | A | 2/1998 | Wang |
| 5,729,662 | A | 3/1998 | Rozmus |
| 5,761,381 | A | 6/1998 | Arci et al. |
| 5,812,992 | A | 9/1998 | de Vries |
| 5,832,466 | A | 11/1998 | Feldgajer |
| 5,835,901 | A | 11/1998 | Duvoisin, III et al. |
| 5,841,949 | A | 11/1998 | Nakaya et al. |
| 5,864,832 | A | 1/1999 | Meyers |
| 5,870,728 | A | 2/1999 | Yatsuzuka et al. |
| 5,870,729 | A | 2/1999 | Yoda |
| 5,920,851 | A | 7/1999 | Muller |
| 5,930,781 | A | 7/1999 | Toomarian et al. |
| 5,937,432 | A | 8/1999 | Yamaguchi et al. |
| 5,974,404 | A | 10/1999 | Moed et al. |
| 6,038,338 | A | 3/2000 | Nguyen |
| 6,151,592 | A | 11/2000 | Inazumi |
| 6,205,556 | B1 | 3/2001 | Watanabe et al. |
| 6,269,351 | B1 | 7/2001 | Black |
| 6,349,293 | B1 | 2/2002 | Yamaguchi |
| 6,366,897 | B1 | 4/2002 | Means et al. |
| 6,415,272 | B1 | 7/2002 | Ulyanov |
| 6,449,603 | B1 | 9/2002 | Hunter |
| 6,516,309 | B1 | 2/2003 | Eberhart et al. |
| 6,553,357 | B1 | 4/2003 | Mathias et al. |
| 6,601,053 | B1 | 7/2003 | Schaffer et al. |
| 2002/0059154 | A1 | 5/2002 | Rodvold |
| 2003/0004904 | A1 | 1/2003 | Kirshenbaum |
| 2003/0014378 | A1 | 1/2003 | Goodnight et al. |
| 2003/0018598 | A1 | 1/2003 | Cawse et al. |

OTHER PUBLICATIONS

Hallinan, J., et al., 1998; *Cooperative Evolution Of A Neural Classifier And Feature Subset,*; Proc. 2nd Asia-Pacific Conference on Simulated Evolution and Learning.

Harter, D. et al., 2001; *Models of Ontogenetic Development for Autonomous Adaptive Systems*; Proceedings of the 23rd Annual Conference of the Cognitive Science Society, pp. 405-410.

Hochman, R., et al., 1996; *Using The Genetic Algorithm To Build Optimal Neural Networks For Fault-Prone Module Detection; In Proc. the Seventh Int. Symposium on Software Reliablity Engineering*, pp. 152-162; White Plains, N.Y.

Keane, M.A., et al., 2002; *Automatic Synthesis Using Genetic Programming of an Improved General-Purpose Controller for Industrially Representative Plants; Evolvable Hardware*, 2002; pp. 113-122.

Michel, O., 1995; *An Artificial Life Approach for the Synthesis of Autonomous Agents*; In J. Alliot, E. Lutton, E. Ronald, M. Schoenauer, and D. Snyers (Eds.), Proceedings of the European Conference on Artificial Evolution. Springer-Verlag.

Kaelbling, L.P., et al. *Reinforcement Learning: A Survey*, (1996), *Journal of Artificial Intelligence Research* 4: 237-285.

Touretzky, D.S., et al., (1997) *Operant Conditioning in Skinnerbots. Adaptive Behavior* 5:219-247.

Byount-Tak Zhang,et al., *Evolutionary Induction of Sparse Neural Trees, Evolutionary Computation*, 1997, vol. 5, No. 2, pp. 213-236.

Byoung-Tak Zhang, et al., *Evolutionary Neural Trees for Modeling and Predicting Complex Systems; Engng. Applic. Artif. Intell.* vol. 10, No. 5 pp. 473-483, 1997.

Koza, John R., 1989, *Hierarchical Genetic Algorithms Operating on Populations of Computer Programs*, Reprinted: Computer Science Department, Stanford University, Stanford, CA; pp. 578-584.

F. Pasemann; *Pole-Balancing with Different Evolved Neurocontrollers*; Max-Planck-Institute for Mathematics in the Sciences, D-04103 Leipzig, Germany; pp. 1-7.

J.R.Koza, et al.; *Evolving Inventions; Scientific American*; 2003; pp. 52-59.

H.Lipson, et al.; *Automatic Design and Manufacture of Robotic Lifeforms; Nature*, vol. 406, Aug. 31, 2000; pp. 974-978.

C.O. Willke, et al.; *Evolution of Digital Organisms at High Mutation Rates Leads to Survival of the Flattest; Nature*, vol. 412, Jul. 19, 2001; pp. 331-333.

R.E.Lenski, et al.; *The Evolutionary Origin of Complex Features; Nature*, vol. 423, May 8, 2003; pp. 139-144.

Y. Sahigematsu, et al.; *A dynamic Neural Cell Model Driven by Pulse Train*; Electrotechnical Laboratory; Umezono Tsukuba Ibaraki JAPAN; pp. 130-133.

P.D. Wasserman, et al.; *Neural Networks, What are they and Why is Everybody so Interested in Them Now?*; Part 2; Institute of Electrical and Electronics Engineering *Expert*, Spring 1988; pp. 10-15.

R.S.Scalero, et al.; *A Fast New Algorighm for Training Feedforward Neural Networks*; Institute of Electrical and Electronics Engineering; Transactions on Signal Processing. vol. 40, No. 1, Jan. 1992; pp. 202-210.

K.E. Kinnear, Jr.; *Evolutionary Computers 1, Basic Algorithms and Operators*, Beck, T. et al. (eds) 2000; Institute of Physics Publishing, Bristol; pp. 102-113.

P.J. Angeline; *Evolutionary Computers 1, Basic Algorithms and Operators*, Beck, T. et al. (eds) 2000; Institute of Physics Publishing, Bristol; pp. 102-113.

D.Tveter; *The Pattern Recognition Basis of Artificial Intelligence* .

S.L.Blyumin, et al.; *Reduction of Adjusting Weights Space Dimension in Feedforward Artificial Neural Networks* Training; IEEE International Conference on Artificial Intelligence Systems; Sep. 5-10, 2002; p. 242.

S.S.Han, et al.; Optimization of Neural Network Structure and Learning Perameters Using Genetic Algorithms; 8th International Conference on Tools with Artifical Intelligence; Nov. 16-19, 1996; Toulousse, France; p. 200.

T.Zhuang, et al.; *A Neuron-Weighted Learning Algorithm and its Hardwae Implementation in Associative Memories*; IEEE Transactions on Computers, 1993; pp. 636-640.

N.P. Archer, et al.; *Learning Bias in Neural Networks and an Approach to Controlling its Effect in Monotonic Classification*; IEEE Transactions on Pattern Analysis and Machine Intelligence, 1993; pp. 962-966.

A.K. Bansal; *Establishing a Framework for Comparative Analysis of Genome Sequences*; IEEE First International Symposium on Intelligence in Neural and Biological Systems May 29-31 1995; p. 84.

M.Hilario, et al.; *A Metalevel Architecture for Knowledge-Based neural Network Design*; IEEE 9th International Conference on Tools with Artificial Intelligence; Nov. 2-8, 1997.

Hampton, A. N. and C. Adami (2004) "Evolution of Robust Developmental Neural Networks" Arxiv.org archive (http://arxiv.org/pdf/nlin.A0/0405011).

K. Kobayashi and M. Ohbayashi "A new indirect encoding method with variable length gene code to optmize neural network structures," IEEE Xplore, 0-7803-5529-Jun. 1999.

Mehrotra, et al. "Elements of Artificial Neural Networks," 0-262-13328-8.

* cited by examiner (2411)(4512)(3300)(3411)(0382)(1205)(2403)(6421)(3320)(1384)(3285)

SYSTEM AND METHOD FOR DEVELOPING ARTIFICIAL INTELLIGENCE

RELATED APPLICATIONS

The present application claims the benefit of U.S. Provisional Patent Application Serial No. 60/440,883 filed on Jan. 17, 2003, the contents of which are hereby incorporated by reference.

FIELD OF THE INVENTION

The present invention relates to artificial intelligence and more particularly to a system and method for developing artificial intelligence.

BACKGROUND OF THE INVENTION

Ever since the introduction of the computer in the 1940s, there has been intense interest devoted to artificially replicating one of the human mind's highest faculties-intelligence. This branch of computer science is known as artificial intelligence (AI), and its goal is to produce a machine that exhibits characteristics associated with human intelligence, such as language comprehension, problem solving, pattern recognition, learning, and reasoning from incomplete or uncertain information.

In the decades of research, the major approach into artificial intelligence has been and still remains the development of increasingly complex algorithms, faster computer hardware, and larger memories, databases, and knowledge bases. With this technology, artificial intelligence researchers have developed expert systems that perform well at specific tasks, such as playing chess or diagnosing medical conditions, as long as the procedures and objectives are precisely defined and do not change. Regardless of their sophistication, however, the capabilities of these systems reflect the intelligence of the designers, not the intelligence of the systems themselves.

The DEEP BLUE™ computer chess system developed by IBM™ is a case in point. The DEEP BLUE™ system employed a combination of computationally intensive brute-force searching of possible chess positions for several moves ahead, sophisticated scoring and searching heuristics, and a database of openings and end-games that was able to defeat the world's top-rated human chess player at the time. What chess audiences had witnessed, however, was merely a triumph of brute force computation to solve a particular problem, not a feat of general intelligence. As a test of machine intelligence, chess might seem like a reasonable choice, because the ability to play chess in humans is a strong indicator of the ability to apply one's intellect to other complex problems. However, a human capable of playing a good game of chess but incapable of solving basic problems in other areas would not be considered intelligent so much as autistic. The DEEP BLUE™ system has no other capabilities outside of chess, and its success in chess does not translate to success in achieving general intelligence.

Accordingly, programming computers to mimic a particular task is unlikely to achieve genuine artificial intelligence, no matter how skilled their programmers become at devising algorithms to solve clearly-defined problems. Rather, there is a need for a learning and problem solving capability that is dynamic, general-purpose, and adaptable to unexpected challenges in a changing environment.

One reason for this shortcoming of this approach is that it models only the outward behaviors of intelligence, not its underlying dynamics. Playing grandmaster level chess is a behavior of intelligent humans, but what makes them intelligent is how they think about chess. In some cases, simulating a few relevant behaviors of a system is sufficient for a practical, artificial alternative. Artificial turf, for instance, is a practical substitute for grass as a green playing surface for football, but if artificial turf is expected to photosynthesize, attract wildlife, or introduce nutrients into the soil, then green pieces of plastic polymers woven through webbed rubber lattices is a poor design. To create intelligence, it is desirable to model not just some of the behaviors of human brains, but how human brains do it.

Unfortunately, the human brain is too complex to model its dynamics directly by duplicating its structure and low-level functions. For example, the human brain is an intricate network of millions of interconnected neurons. The region responsible for intelligence, the cerebral cortex, itself has several dozen different areas, and each area has about six different layers. Each layer has its own composition of several different types of neurons, and each type of neuron responds to input stimuli in its own way with its own characteristic firing rate and intensity. The types, arrangements, and dynamics of neurons and the connections between neurons show enormous variation across the layers, areas, and regions of the brain. Although the neuroscientific literature is rich with descriptions of the different neurons and connection types, there are as yet no successful theories of how the mind emerges from the inner workings of the brain. Without understanding how the brain achieves intelligence, artificial intelligence researchers are having a very hard time reproducing intelligence by mimicking the brain.

Even simplified models of the human brain have not been successful for attaining general intelligence. For example, one approach is to simulate the action of the human brain by using artificial neural networks, consisting of connected "artificial neurons" arranged in layers. FIG. 18 shows an artificial neural network 1800, including an input layer 1801 of three artificial neurons 1803, 1805, and 1807, usually one hidden layer 1809 (artificial neurons 1811, 1813, 1815, and 1817), and an output layer 1819 with artificial neurons 1821 and 1823. Each layer 1801, 1809, and 1819 is fully interconnected and signal processing is feed-forward, meaning that each artificial neuron in a given layer receives input signals from every artificial neuron in the previous layer and transmits an output signal to every artificial neuron in the next layer. Each artificial neuron produces output as a function of the weighted sum of its inputs, and the output of the artificial neural network as a whole depends on all the connection weights. Although most artificial neural networks have more artificial neurons than depicted in FIG. 18, they are rarely more complex than this multi-layer, feed-forward structure.

Artificial neural networks operate in two successive stages: programming and execution. In the programming stage, the artificial neural network is trained by applying a set of training patterns, such as letters of an alphabet for optical character recognition, to the input layer 1801 and adjusting the connection weights of all the artificial neurons until the appropriate outputs are produced at the output layer 1819. When the programming stage is complete, the artificial neural network is ready for the execution stage, in which the artificial neural network is used to classify inputs applied to the artificial neural network in relation to the patterns previously presented in the training set. Artificial neural networks have had some success in recognizing and classifying patterns, especially in hand writing and other character recognition applications, and they are often very robust with respect to noisy data. However, once an artificial neural network enters the execution stage, its capability to recognize new patterns is fixed until its connection weights are completely reprogrammed on a new training set. For example, if the artificial neural network had been trained to optically recognize characters of an alphabet, augmenting the alphabet with a new character requires the connection weights in the artificial neural network to be reset and retrained from scratch.

Because of this inherent limitation, artificial neural networks, despite their superficial and terminological resemblance to biological neural systems, show little promise of progressing over other approaches to artificial intelligence. While artificial neural networks and expert systems are programmed differently, the result is fundamentally the same—a relatively static system that executes a precise and predetermined series of calculations but which cannot learn or exhibit other signs of intelligence.

As disclosed in U.S. Pat. No. 6,424,961, issued Jul. 23, 2002, entitled "Adaptive Neural Learning System," the contents of which are incorporated by reference herein in their entirety, I have invented a neural learning system capable of readjusting its connection weights with negative and positive reinforcements based on the temporal proximity of neural firings and levels of system activity. Accordingly, my neural learning system is adaptive, able to adjust its programming during its execution to recognize new patterns or perform new tasks without having to reprogram the neural learning system from scratch for a new problem. Furthermore, instead of the basic feed-forward arrangement of conventional artificial neural networks, neurons in my neural learning system can be connected in feedback loops of various sizes and complexities.

Compared to conventional artificial neural networks, my neural learning system is much more capable of representing the complexity of the human brain, but it is still unclear how much of the complexity of the human brain needs to be simulated to achieve intelligence. Although the brain's complexity is certainly sufficient for achieving intelligence, it is possible that much of this complexity has nothing to do with intelligence, for example, being used for maintaining body temperature, coordinating muscle movements, and other activities. In fact, some of the brain's complexity may not be used at all, being the legacy of a lengthy evolutionary process that had to produce fully functional intermediaries at each generation from the less intelligent ancestors of humans.

Therefore, a lot of the brain's complexity may in fact be unnecessary except as an inevitable evolutionary by-product for achieving intelligence, indicating that a detailed replication of the exact structure of the human brain is not a practical avenue for success. Nevertheless, there still remains a long-felt need for a breakthrough in artificial intelligence, in which machines can be developed that are genuinely intelligent, not idiot savants capable of performing only one pre-programmed task extremely well.

SUMMARY OF THE INVENTION

The present invention pertains to an effort to produce genuine artificial intelligence, instead of attempting to replicate a specific result of evolution or to perform specified tasks as has been done in prior art systems. In the invention, the evolutionary mechanism itself is used to develop systems that exhibit intelligence. The long-standing frustrations in artificial intelligence research are addressed by subjecting generations of adaptive neural systems to a competitive, rigorous selection regime in which fitness is judged by intelligence. The result of this process is artificial intelligence.

In one embodiment, the invention provides a method for encoding a specified neural system into a representative genome, wherein the neural system comprises an array of interconnected neurons and each neuron has an input and an output. The method comprises, for a given neuron, encoding a specification of the conversion of neuron input to neuron output by a processing gene corresponding to the given neuron, and encoding the connections from the given neuron by one or more corresponding connection genes. The processing genes and connection genes corresponding to respective neurons of the neural system are selectively ordered to form the genome. Preferably, the genome includes different types of processing genes and connection genes, each type of processing gene encoding a different type of neuron and each type of connection gene encoding a different type of interaction between neurons. Preferably also, the method includes the step of performing mutation operations on selected processing genes and connection genes.

A further embodiment of the invention is directed to a method for building or assembling a neural system for use in a specified application, wherein a genome is encoded to represent one or more types of neurons in an array, and to further represent one or more types of interactions between the neurons. The method includes the steps of inserting neurons encoded in the genome into the neural system as input neurons, selectively building connections between respective input neurons, and selectively creating new neurons.

Yet another embodiment of the invention is directed to a method for developing a neural system adapted to perform a specified task. This method comprises the steps of selecting a population of neural systems, each neural system comprising an array of interconnected neurons, and encoding each neural system into a representative genome. The genome for a given neural system encodes a neural output function for each neuron in a corresponding processing gene, and encodes the connections from each neuron in one or more corresponding connection genes, each including a weight function. The method further comprises operating the given neural system to perform the specified task during a trial period, and continually monitoring performance of the given neural system during the trial period. Reinforcement signals determined from the continually monitored performance are applied as inputs to the functions of respective processing genes and connection genes of the given neural system. At the conclusion of the trial period, the fitness of the given neural system for performing the specified task is determined. Usefully, fitness is determined as a function of the reinforcement signals.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for developing artificial intelligence are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

I. Virtual Evolution

The quest for artificial intelligence is not a mirage: genuine intelligence has been produced once, by evolution. While the understanding of the mechanisms underlying intelligence is still in its infancy, comprehension of the mechanisms underlying evolution—mutation, selection, and reproduction—is as mature as any other field of science. Accordingly, one aspect of the invention relates to harnessing the evolutionary mechanisms that have produced genuine intelligence once to produce intelligence again.

Figure 1:
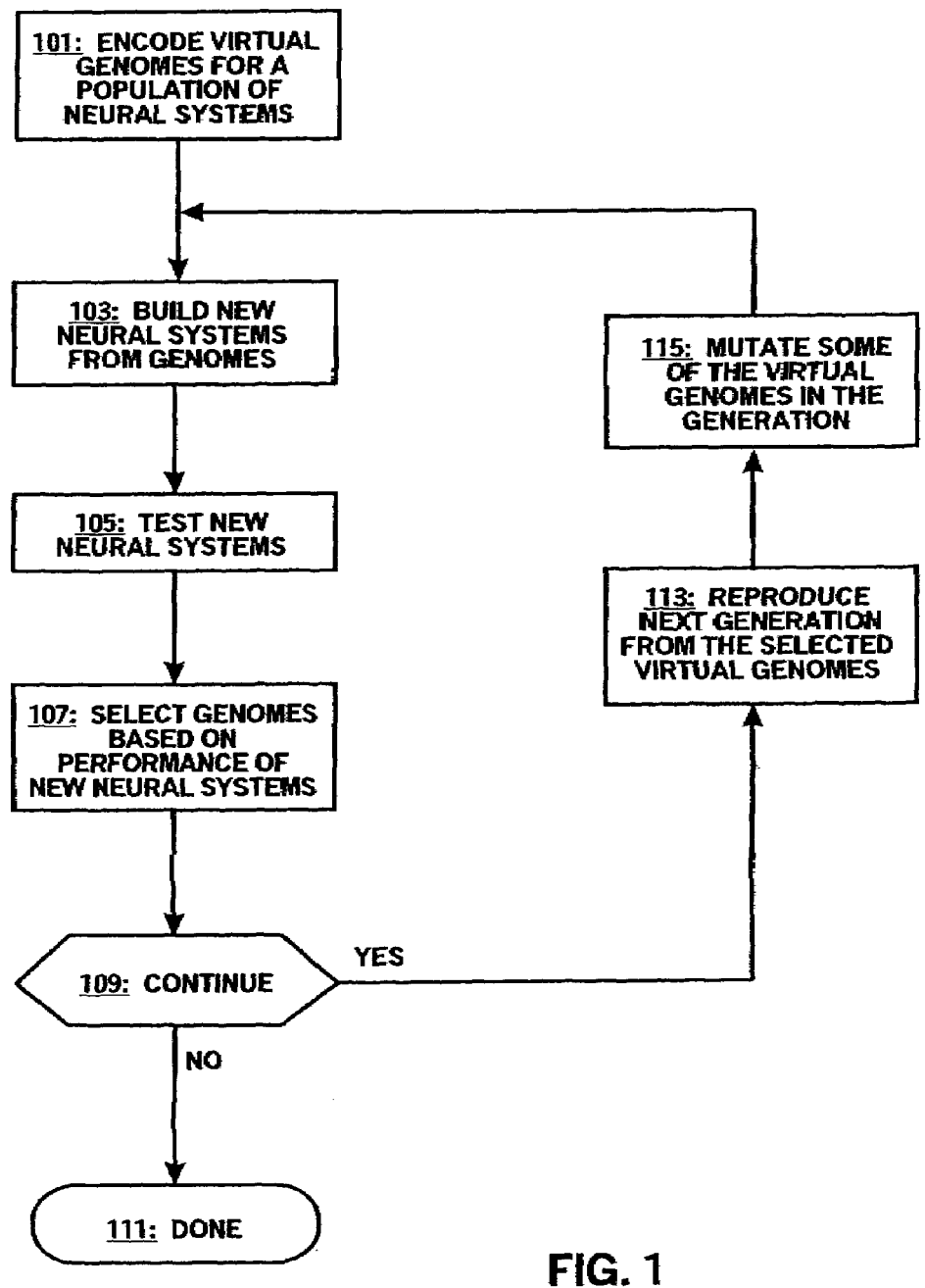
FIG. 1 is a flowchart showing the operation of one embodiment of the present invention.

FIG. 1 is an overview of a process for developing artificial intelligence using virtual evolution in accordance with one aspect of the present invention, including the phases or steps of encoding genomes (101), building new neural systems, or brains, from the genomes (103), testing the new neural systems (105), genome selection (107), continuation/termination (109), reproduction (113), and mutation (115).

At phase 101, a set of virtual genomes is generated, in which each virtual genome encodes and represents a corresponding type of neural system. In a digital implementation, a virtual genome includes a sequence of bits, representing processing genes and connection genes, that specify parameters for assembling a neural system comprising different types of interconnected neurons. One implementation of a virtual genome is described in greater detail hereinafter.

In phase 103, new neural systems are built from respective genomes. To assemble a new neural system, neurons encoded in a corresponding genome are provided as input neurons, the initial number of input neurons being determined by the intended application of the new neural system. Connections are then built between respective input neurons, and further neurons and connections therebetween are created in accordance with specified rules or principles. The procedure for building new neural systems in described hereinafter in further detail.

In the testing step 105, a new neural system is operated to perform a specified task during a trial period. System performance is continually monitored during the trial period, and positive and/or negative reinforcement signals, in response to the monitored performance, are applied as inputs to the new neural system. The procedure for testing new neural systems is likewise described hereinafter in further detail. In a very useful embodiment of the invention, the fitness of a new neural system for performing the specific task is computed from the applied reinforcement signals at the end of the trial period.

Step 107 relates to the selection phase of the virtual evolution. After the fitness of each neural system exhibited in the selection trial has been determined, a subset of the genomes is selected that includes the more intelligent neural systems in the population. Genomes are selected by comparing measured fitness levels of respective corresponding neural systems. Various ways to select genomes based on measured fitness of the corresponding neural systems can be employed. For example, the selection can be based on rank order (e.g. the top 10 or top 10% most fit), absolute threshold (any genome whose fitness measurement is greater than X), or stochastically (e.g. randomly selecting genomes weighted in accordance with the fitness measurements). Other methods may also be used, wherein the survival of genomes is positively correlated with the measured intelligence.

Step 109 pertains to the decision to continue or terminate the virtual evolution process. This decision may depend on different factors, including the number of generations produced, the amount of time spent, the intelligence fitness scores achieved, the monetary cost of the project, the evolution history, or the like. In fact, the virtual evolution may proceed indefinitely, with intelligent neural systems being sampled from the current population on an as-needed basis. If the decision to terminate a run of virtual evolution is affirmative, then the process is complete (step 111), and neural systems in the current population are ready for use in applications involving intelligence.

If, on the other hand, the virtual evolution process is to continue, then a next generation of virtual genomes is generated (step 113) from the population of genomes that has survived the selection phase 107. Reproduction involves copying at least one or more of the genomes in the selected population for the next generation. In practice, however, the reproduction phase is often combined with the following but conceptually distinct mutation phase 115, in which portions of the new genomes are stochastically perturbed. Mutation can also involve recombination between two or more parent genomes. Not every reproduced genome or every gene of the genome need be mutated, and, in fact, the mutation rate is preferably low enough to allow for intelligent neural systems to persist in the population.

After mutation in step 115, the virtual evolution process loops back to step 103 where the next generation of neural systems is subjected to the cycle of steps 103–107, 113 and 115, as described above, until the termination condition in step 109 is triggered.

Computer scientists have been experimenting with genetic algorithms and other methods of artificial evolution for over a quarter century, finding solutions to many problems that are impractical with direct algorithmic techniques. Designing an evolutionary system tasked with creating intelligence, however, poses many challenges that are unusual to practitioners of typical evolutionary computation problems.

For example, in most applications of genetic algorithms, the structure of the solution space is well-characterized in advance, so the evolutionary process only requires fine-tuned adjustments to a set of predefined parameters. Thus, genetic algorithms can be used for finding connection weight values in artificial neural networks in the programming stage. The structure of artificial neural networks is fairly rigid and the investigation is limited mainly to deciding how many artificial neurons in the hidden layer to use. By contrast, the structure of a genuinely intelligence neural system is not so well understood, so having a capacity as creative as biological evolution in originating novel parameters and structures is desirable. Specifically, it is desirable for new types, arrangements and dynamics of neural processing elements and their interrelations to be evolved, as well as whole systems of these elements and interrelations, from as simple as artificial neural networks to as complex as cortical circuits.

As another example, unlike most evolutionary computation problems where quantitative comparisons of performance among the competing individuals are straightforward, the performance metrics in selecting for an abstract and general trait like intelligence are difficult to design. Nevertheless, some principles can be articulated. Individuals should be tested on their ability to adapt to changing environments, to make deductions and draw inferences, and to choose the most appropriate course of action from a wide range of alternatives. Above all, the individual should be able to learn how to do these things on its own, not by implementing specific instructions given to it by a programmer, but by continuously responding to positive and negative environmental feedback. The selection regime itself may become progressively more difficult as the population becomes progressively more capable, just as intelligence tests administered to ten-year-olds in middle school are more challenging than those administered to five-year-olds in kindergarten.

II. The Genome

The first challenge in designing a suitable evolutionary system is determining the structure of the virtual genome. The basic genetic building blocks that constitute the genome ought to be versatile enough to construct a large universe of potential processing elements and interactions within artificial brains. On the other hand, the genetic building blocks should not be so general and versatile that the system mainly evolves structures unrelated to intelligence. Thus, the basic genetic building blocks for developing artificial intelligence preferably involve the building blocks of brains, i.e., neurons. In other words, genomes for intelligence systems preferably comprise genes that code for different kinds of neurons and for different kinds of interactions between neurons.

Figure 2:
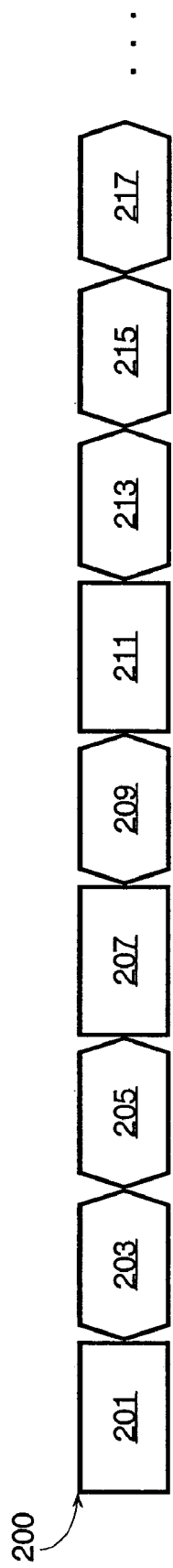
FIG. 2 depicts an embodiment of a genome.

One example of a genome is shown in FIG. 2, in which each neuron is encoded by a processing gene (rectangles) and one or more connection genes (hexagons) that follow. Specifically, genome 200 comprises a sequence of genes, in which a first type of neuron includes processing gene 201 and connection genes 203 and 205, a second type of neuron represented by processing gene 207 and connection gene 209, and a third type of neuron coded by processing gene 211 and connection genes 213, 215, and 217.

In this embodiment, a processing gene specifies how each neuron calculates its output, and a connection gene, of which each neuron may contain several, specifies how that output is transmitted to other neurons. Preferably, the genome need not specify the exact number, configuration, and connections in the neural system the genome encodes, or else the genome would become as complicated as the neural system itself. In fact, specification at this detailed level may be counterproductive since it is desirable in some embodiments of the invention for connections to be created and destroyed between different neurons as learning takes place, as it does in humans. Rather, the network configuration of the corresponding neural system, including the number of each type of neuron in the genome and the physical layout of every neuron in relation to one another, is emergent from the information encoded in the genome. Thus, the genome is preferably a compact representation of the building blocks for assembling neural systems, not the blueprint of a specific instance or configuration of a neural learning system.

Another benefit of a compact genome is that mutations applied to the genome can result in behavioral changes. Mutations at the gene level are described hereinafter, but genomic-level mutations can be applied in the mutation step 111 of FIG. 1. For example a cross-over mutation can be applied at the genome level without regard to the internal representation of the various different genes, by splitting a pair of genomes in two at random places and swapping the ends. Deletion and insertion operations can excise one or more genes from one genome and splice them into another.

Population subdivision and migration can also be implemented to provide another source of genetic variation. When a population is subdivided such that genomic-level crossovers and deletion/insertions occur only between members of the same subpopulation, the different subpopulations become semi-isolated genetic entities, each exploring different sectors of the solution space, each with varying degrees of success. Population subdivision therefore increases the overall genetic diversity found within the entire population and increases the probability that a successful genetic solution is found. Occasional migration of genomes between subpopulations allows for adaptively favored genes in one subpopulation to be distributed to the rest of the gene pool.

The genome shown in FIG. 2 is haploid, like those of most microorganisms, having only a single copy of its chromosome; however, genomes in other embodiments of the invention can be diploid (with their chromosomes coming in pairs, like humans), triploid, or polyploid, providing redundancy and more fine-tuned genetic control. In fact, ploidy can be dynamic, letting the optimum number of sister chromosomes per genome be determined by evolution.

A. Processing Genes

Figure 3:
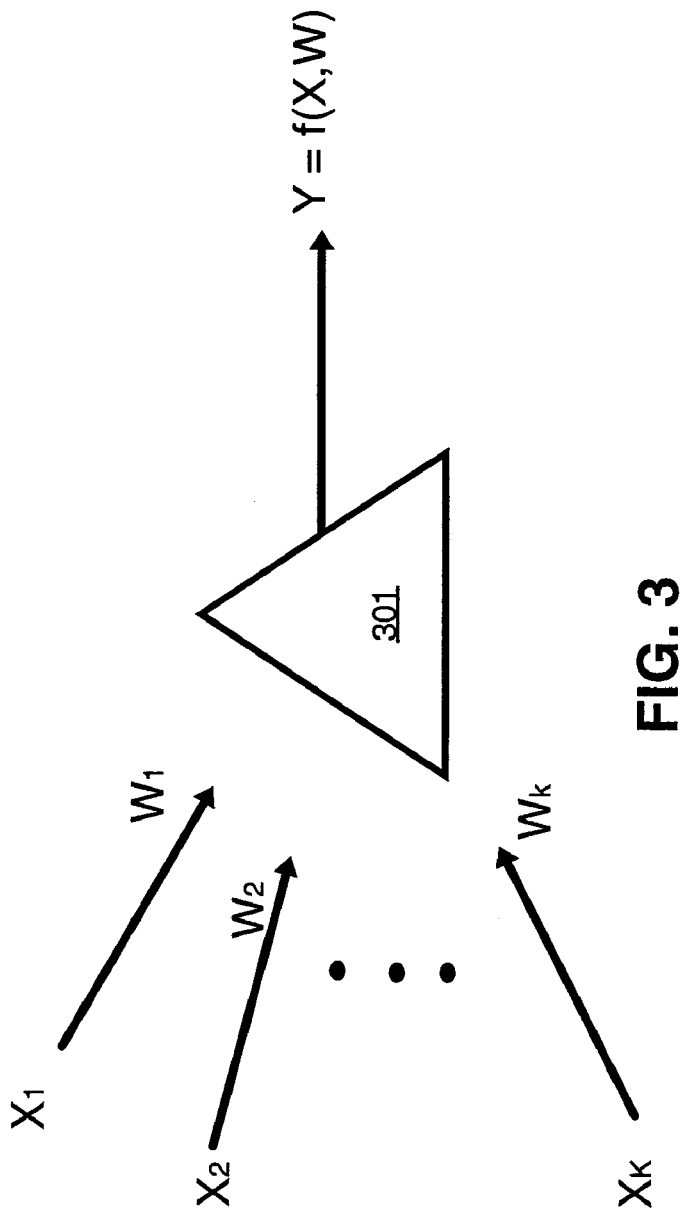
FIG. 3 shows an embodiment of a processing neuron.

A processing gene determines how each neuron converts its input to output. The input to a neuron comes from the environment or from the outputs of other neurons that are connected to the neuron, modified by the respective weights of those connections. Each neuron then performs a function on that input, and the resulting output becomes an input to other neurons in the network or is transmitted to the environment. A diagram of this processing is shown in FIG. 3, in which there are k connections to neuron 301, $x_i$ represents an input signal for connection i∈ 1 . . . k (which is the output produced from another neuron or an environmental input) and $w_i$ represents the weight for connection. The output of neuron 301, y, is a function of all the x's and w's.

One of the simplest processing functions is found in a fundamental type of neuron used in artificial neural networks called a "perceptron." Perceptrons perform a threshold gating function: $y = \{1 \text{ if } \Sigma x_i w_i \geq \theta; -1 \text{ if } \Sigma x_i w_i > \theta\}$, where $x_i$ is the input received form connection i ∈1 . . . k, $w_i$ is the weight of the corresponding connection, and θ is a neural threshold. In other words, the output of a perceptron is one (1) if the combined sum of the weighted inputs $\Sigma x_i w_i$ exceeds the threshold θ; otherwise the output is negative one (−1). A common variation of the artificial neural network perceptron performs a sigmoidal function on the sum of the inputs: $y = (1 + e^{-((\Sigma x_i w_i) - \theta)})^{-1}$. The output of this sigmoidal function ranges between zero and one, with intermediate values following an S-shaped curve.

More sophisticated examples are described in my U.S. Pat. No. 6,424,961. Some of the neurons described therein incorporate a negative reinforcement signal NR into the processing function: $y = \{1 \text{ if } \Sigma x_i w_i \geq q; 0 \text{ if } \Sigma x_i w_i < q\}$, where $q = \{\theta_- \text{ if the neuron has fired recently}; \theta_- - NR \text{ if the neuron has not fired recently}\}$. During operation, the negative reinforcement signal NR temporarily lowers the neural thresholds of inactive neurons, thereby increasing firing activity in the neural system, which leads to creating new neural pathways and disrupting old pathways. The magnitude of negative reinforcement signal NR determines the amount of lowering of the threshold.

These and other neural output functions are encoded in processing genes of virtual genomes. In accordance with one embodiment of the present invention, the neural output functions are encoded as mathematical expression trees, such as those employed in the artificial evolution subfield of genetic programming (GP). Specifically, a mathematical expression describing the neural output function is canonicalized into a standard form (such as nested parenthetical statements) and represented as a tree structure of internal nodes and leaf nodes corresponding to the canonicalized form. Internal nodes correspond to mathematical operators, which apply a function or other mathematical operation to the values from nodes directly below the internal node. Leaf nodes are on the bottom of the tree, and they represent constants, variables, and other terminals input into the mathematical expression tree.

The set of terminals that can be used in leaf nodes and the set of operators for internal nodes are preferably both simple and general enough to allow the evolution of a diverse variety of mappings from neural input to neural output. A summary of the terminal set and the operator set of one embodiment of the present invention is given in TABLE 1 and TABLE 2, respectively.

TABLE 1

| SYMBOL | TERMINAL |
|---|---|
| −1 through 9 | Integers |
| IN | Neural input |
| CI | Cumulative input |
| LF | Time since last fire |
| OF | Output of last fire |
| PR | Positive reinforcement |
| NR | Negative reinforcement |
| RG | Register |

In TABLE 1, the terminal set contains integers from −1 to 9 and system variables that the neurons may incorporate into their processing calculations. For example, the neural input IN represents the sum of the weighted inputs received over the course the current time interval. The cumulative input CI represents the sum of all the weighted inputs received since last firing (e.g., over the time intervals since the neuron last had a non-zero output). Neural output can be interpreted as an artificial analog of firing frequency, burst frequency, burst intensity, or any other measurement of neural activity. The terminal set also includes positive reinforcement PR and negative reinforcement NR signals. These signals are administered to help train the network, as described in more detail hereinafter. The register RG is initially zero and stores a value when ever a STR (store) operator is evaluated.

TABLE 2

| SYMBOL | OPERATOR |
|---|---|
| + | $y = a + b$ |
| − | $y = a - b$ |
| * | $y = a \times b$ |
| % | $y = \{ a/b \text{ if } b \neq 0; 1 \text{ if } b = 0 \}$ |
| EXP | $y = a^b$ |
| LIN | $y = b \times a + 0.5$ ($y \in [0,1]$) |
| SIG | $y = 1/(1 + e^{-b \times a})$ |
| TRI | $y = 1 - |b \times a|$ ($y \geq 0$) |
| RAD | $y = e^{-(b \times a)^2}$ |
| THR | $y = \{ 0 \text{ if } a < b; a \text{ if } a \geq b \}$ |
| STP | $y = \{ 0 \text{ if } a < b; 1 \text{ if } a \geq b \}$ |
| STR | $y = a$; store y in register |

The operator set in TABLE 2 contains arithmetic operators and nonlinear operators that can collectively serve as the building blocks for a great variety of neural processing functions. In TABLE 2, argument a is considered the main input to the operator, and b is considered a modulating parameter that shapes of the operator's output curve, e.g. the slopes in the LIN, SIG, TRI and RAD functions, and the threshold of the THR and STP operations.

Figure 4:
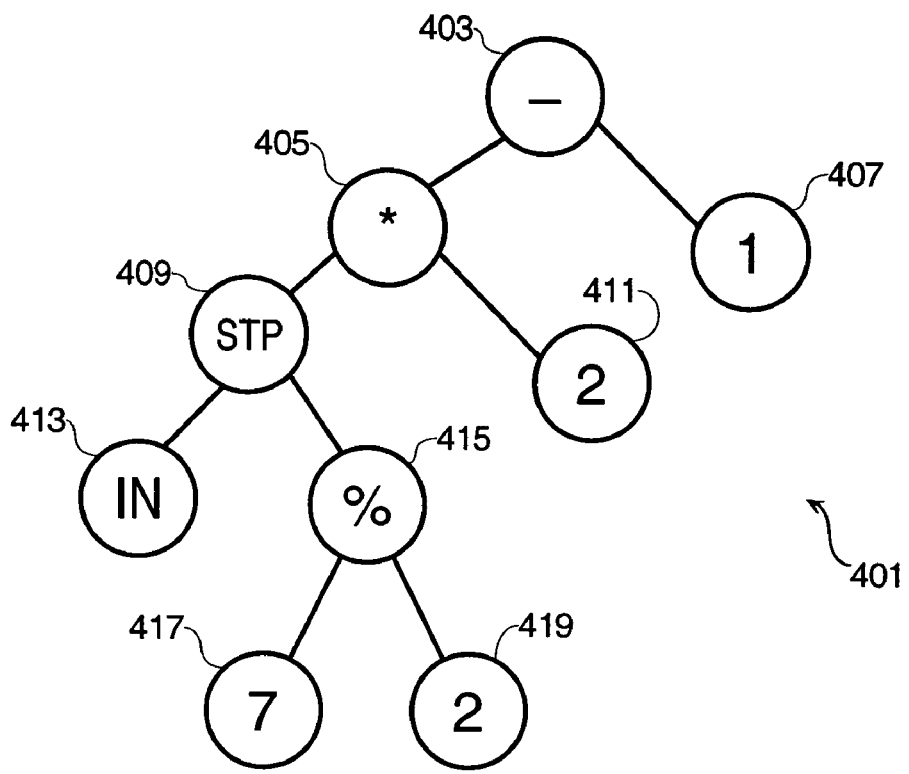
FIG. 4 shows an expression tree for the output function of a basic perceptron.

The neural processing functions described at the beginning of this section can be encoded into processing genes using genetic programming trees. For example, the simple artificial neural network perceptron, with a threshold of, say, 3.5, can be implemented as shown in FIG. 4. Specifically, the output function of $y = \{1 \text{ if } \Sigma x_i w_i \geq \theta; -1 \text{ if } \Sigma x_i w_i > \theta\}$, can be constructed in terms of the operators and terminals in TABLES 1 and 2, respectively, as the fully parenthesized canonical expression: (((IN STP (7/2))×2)−1), where the 7/2 is used to generate the value of 3.5, IN stands for $\Sigma x_i w_i$, and the operations of ×2−1 are used to force the output of the STP operator from the range [0, 1] into [−1, 1]. Accordingly, mathematical expression tree 401 includes internal node 403, which holds the—operator that operates on values from internal nodes 405 and 407 (which holds the terminal symbol of 1). The internal node 405 contains the * operator and takes values from internal nodes 409 and 411, which is 2. The internal node 409 encodes the STP function, operating on values from leaf node 413 (holding the IN terminal) and internal node 415, which includes a divisional % operation on 7 in leaf node 417 and 2 in leaf node 419.

Figure 5:
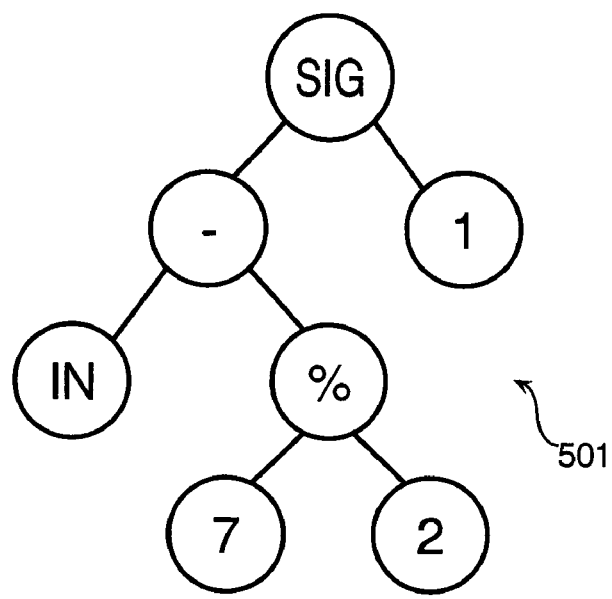
FIG. 5 illustrates an expression tree for a sigmoidal output function of a perceptron.
Figure 6:
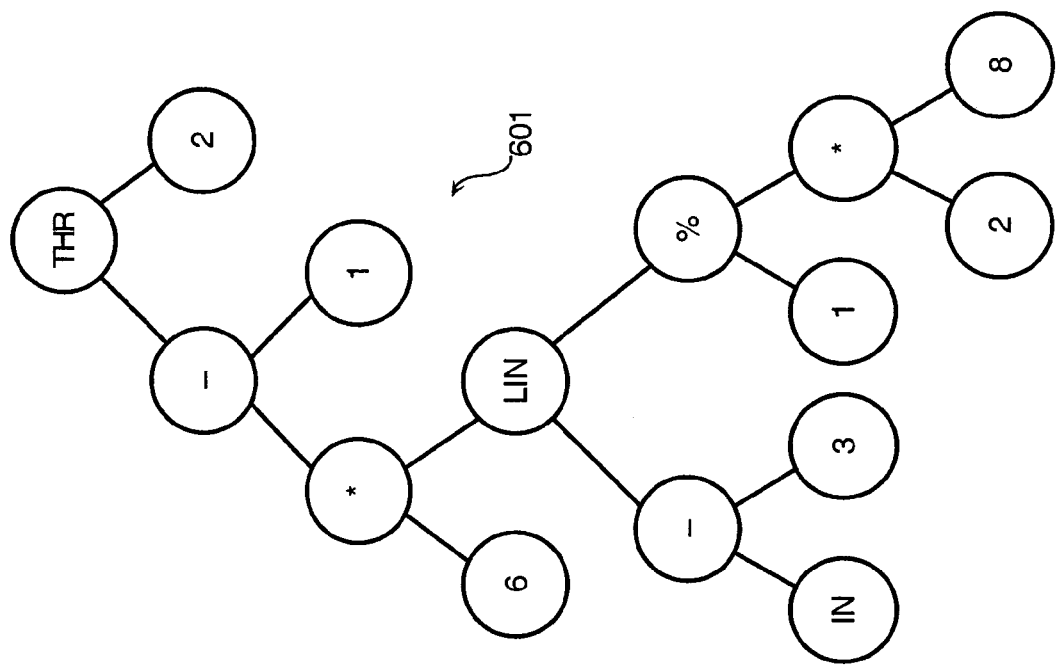
FIG. 6 illustrates an expression tree for a more elaborate output function of a neuron.

Neural processing functions can be more elaborate than the perceptron of FIG. 4. For example, the output function for a sigmoidal artificial neural network perceptron with a threshold of 3.5 would be implemented as mathematical expression tree 501 as shown in FIG. 5. As another example, shown in FIG. 6, a mathematical expression tree 601 employs an output function with a threshold of 3 such that, if the input is below the threshold, the output is zero; and above the threshold, the output ranges from 2 to 5, with intermediate values linearly proportional to the magnitude of the input.

Figure 7:
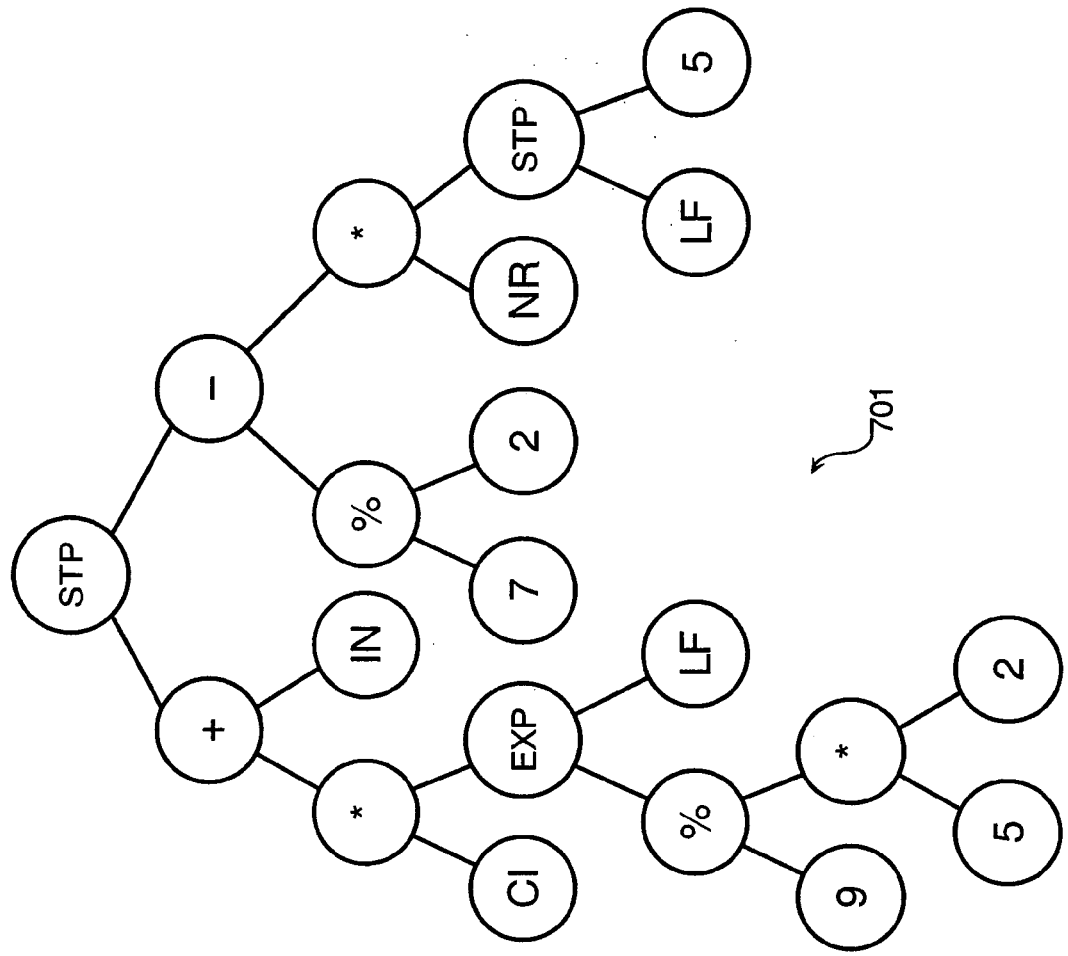
FIG. 7 depicts an expression tree for an output function using negative reinforcement in accordance with an embodiment of the invention.

Some of the neural processing functions of the adaptive neural learning systems described in my U.S. Pat. No. 6,424,961 are more elaborate. For example, one adaptive neural learning processing function uses a variable threshold that is decreased by the negative reinforcement NR, only if the neuron has not fired recently. Furthermore, the neural input not only consists of the weighted inputs IN received during the current time interval but also incorporates the cumulative input CI received at every time interval since the most recent firing. While the cumulative input CI may grow with each passing time interval, its contribution to the neural input steadily diminishes over time: e.g., the cumulative input CI is reduced by a factor of 0.9 every time interval since the neuron last fired, or $0.9^{LF}$. If the combined input is equal to or greater than the threshold, then the neuron fires with an output one; otherwise, the output is zero. This function, with the initial threshold set to 3.5 and "recently" defined as in the last 5 time intervals, can be represented by mathematical expression tree 701 in FIG. 7.

Figure 8:
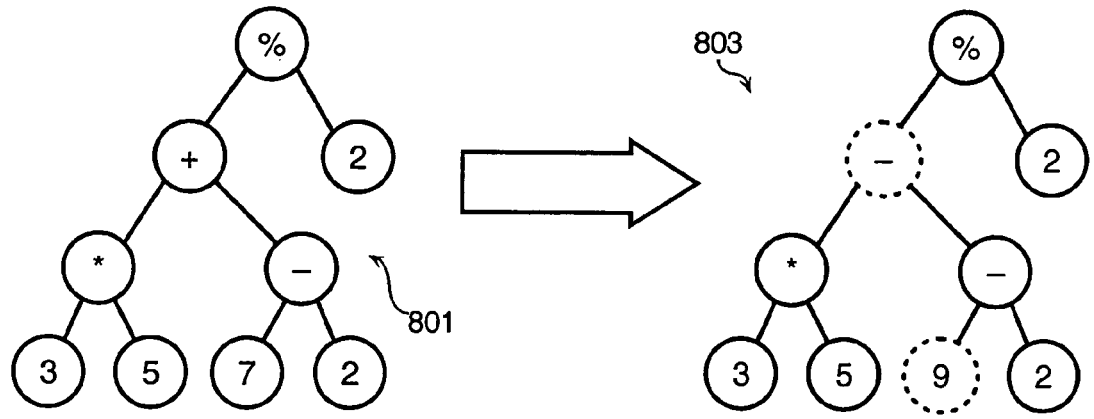
FIG. 8 illustrates point mutation.

Evolution involves mutation, and one advantage of representing processing functions as mathematical expression trees is that every possible tree is a syntactically valid expression. This feature improves the efficiency of the evolutionary process, since mutations result in valid processing functions, a distinct advantage over biological evolution, in which mutations can result in non-viable offspring. There are at least two types of mutation operations that can be performed on mathematical expression trees: point and crossover. Point mutations, illustrated in FIG. 8, substitute stochastically determined values in stochastically determined individual nodes within a mathematical expression tree. In FIG. 8, mathematical expression tree 801 is subjected to two point mutations to produce mutated mathematical expression tree 803.

Figure 9:
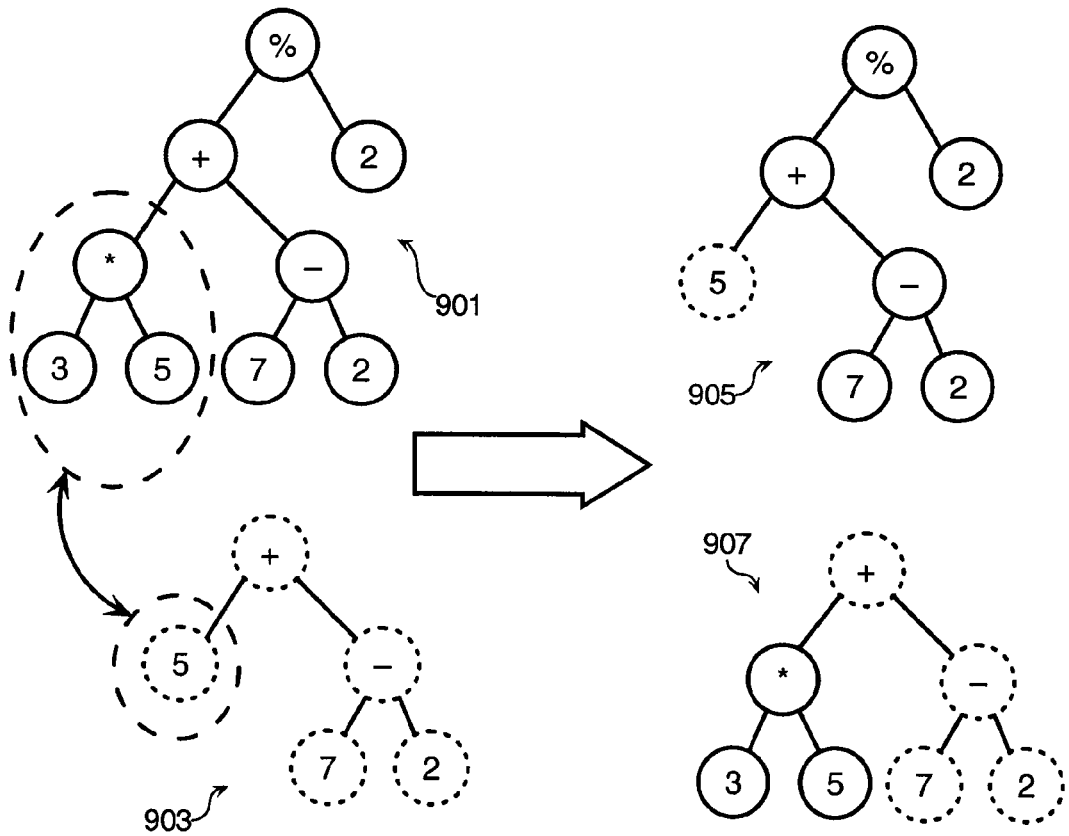
FIG. 9 illustrates cross-over mutation.

Crossover mutations create a reciprocal exchange of genetic material between two genotypes, producing offspring that are a genetic mixture of their parents. As shown in FIG. 9, crossover works by selecting a random branch cluster from within each parental mathematical expression tree (901, 903) and exchanging them to produce two offspring trees (905, 907).

With this repertoire of terminals, functions, and mutational operators, a diverse variety of potential mappings from neural input to neural output can be encoded in the processing genes, enabling virtual populations to evolve and optimize novel types of neurons.

B. Connection Genes

Figures 10, 11:
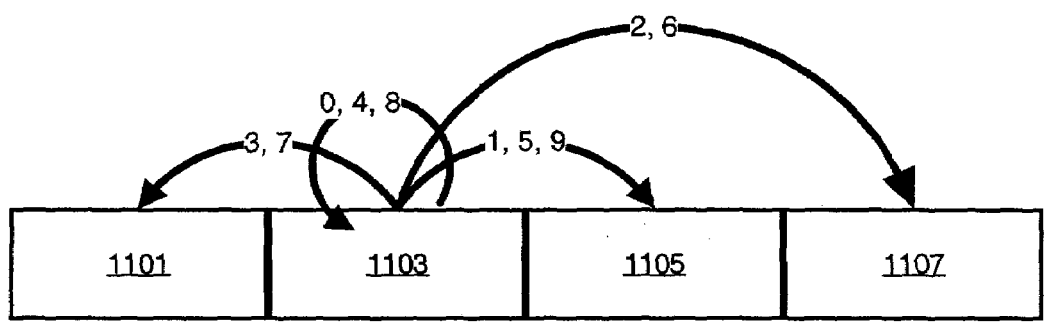
FIG. 10 shows a connection gene in accordance with one embodiment of the present invention.
FIG. 11 illustrates the operation of one embodiment of a target sub-gene depicted in FIG. 10.

Connection genes specify how to generate values for the connection weights and determine which neurons connect to which others. Since connection genes specify more information than processing genes, they are more complicated. In one embodiment, as shown in FIG. 10, a connection gene 1001 is subdivided into five sub-genes: a count sub-gene 1003, a direction sub-gene 1005, a range sub-gene 1007, a target sub-gene 1009, and a strength sub-gene 1011.

The count sub-gene 1003, the direction sub-gene 1005, the range sub-gene 1007, and the target sub-gene 1009 specify how neurons are wired together in a neural system. These sub-genes encode parameters that determine respectively how many connections are made, where the connections go, how far the connections can reach, and what type of neurons to connect to. In one implementation, each count sub-gene 1003, direction sub-gene 1005, range sub-gene 1007, and target sub-gene 1009 hold a single integer from zero to nine, corresponding to ten different alleles or values. The alleles for the count sub-gene 1003, the direction sub-gene 1005, and the range sub-gene 1007 are given in TABLE 3.

TABLE 3

| ALLELE | COUNT | DIR. | RANGE |
|--------|-------|------|-------|
| 0 | 1 | −3 | 1 |
| 1 | 1 | −2 | 2 |
| 2 | 2 | −1 | 5 |
| 3 | 2 | 0 | 10 |
| 4 | 4 | 1 | 20 |
| 5 | 4 | 2 | 50 |
| 6 | 8 | 3 | 2–5 |
| 7 | 12 | any | 5–10 |
| 8 | 20 | any | 10–20 |
| 9 | 40 | any | 20–50 |

The count sub-gene 1003 specifies the number of connections of each type made by each type of neuron; for example, a count allele of 3 means that there are 2 connections. The total number of connections made by each neuron is the sum of the count alleles of each of the neuron's connection genes. The direction sub-gene 1005 and the range sub-gene 1007 determine where each of the connections goes. The direction allele stored in the direction sub-gene 1005 specifies which way and through how many layers the connections project. For example, the numbers −3 through 3 indicate how many neural layers behind (if negative) or ahead (if positive) to send the connections, in which zero means the connections stay on the same layer as the originating neuron, and "any" means the connections can go in any direction. The range allele in the range sub-gene 1007 specifies how far apart within a single layer the connections can be from one another, with distances measured in neurons.

The target sub-gene 1009 indicates what kind of neurons the connections should link up with. Its value indicates the relative chromosomal position of the intended target neuron type. Referring to FIG. 11, by way of example, a genome with four neuron types 1101, 1103, 1105, and 1107. The arrows point to the potential target types for the connections made by type 1103. The target allele determines which arrow to follow: a zero means the connection is made to a neuron of the same type as itself, a one means the connection is to the type located one chromosomal position over to the right, a two means to the type two over, and so on. When the end of the genome is reached, counting resumes from the other side, so in this example the one, five, and nine alleles all point to type 1105.

Mutations can act on the count sub-gene 1003, the direction sub-gene 1005, the range sub-gene 1007, and the target sub-gene 1009 for changing the behavior of the connection. In one implementation, the allele values are incremented or decremented, but other types of point mutations may be used. Some of these mutations can have a major effect on the circuitry of the neural system, while other mutations might not have any.

Referring back to FIG. 10, the strength sub-gene 1011 encodes a weight function that determines the weight of the connection. A weight is a tunable amplifier acting on signals traveling through the connection. Every time a neuron fires, the output of the weight function is multiplied to the output of the processing function, and the resulting product is transmitted to the "post-synaptic" neuron at the other end of the connection. Changes in weights affect the neural system's firing dynamics, which can ultimately lead to changes in the behavior and intelligence of the neural system. Learning the right behaviors involves finding the right weights, and the weight function enables that process.

The strength sub-gene 1011 can be represented by mathematical expressions trees similar to those of processing genes. In one implementation, the strength sub-gene uses the function set shown in TABLE 2, and the terminal set shown in TABLE 1 augmented by the following terminals of TABLE 4:

TABLE 4

| SYMBOL | EXTRA TERMINALS |
| --- | --- |
| LP | Time since last fire of post-synaptic neuron |
| OP | Output of last fire of post-synaptic neuron |
| WT | Current weight |

Two of these terminals are properties of the post-synaptic neuron: LP is the time (in intervals) since the post-synaptic neuron last fired, and OP is the output of the post-synaptic neuron's last firing. A third terminal is WT, the current weight of the connection. The WT values are initially set to zero but then reflect during the neural system's life cycle the output of their weight functions.

Figure 12:
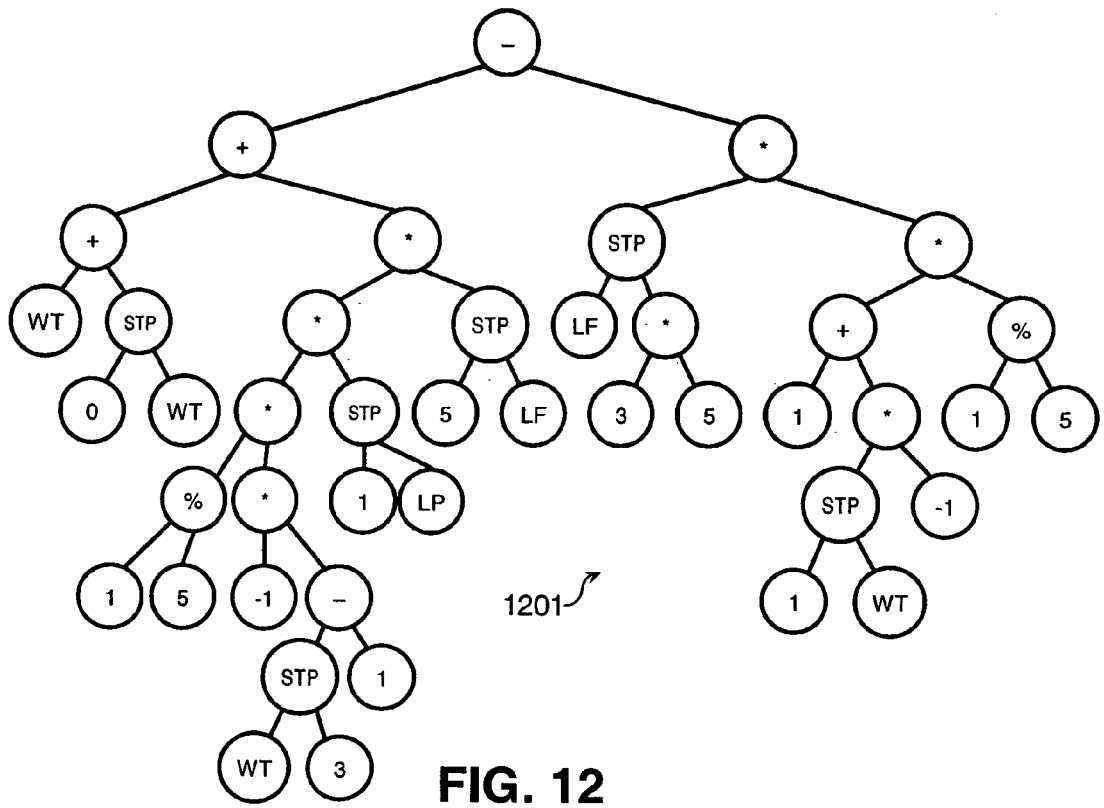
FIG. 12 shows an expression tree for a Hebbian weight function encoded in a strength sub-gene.

FIG. 12 shows a Hebbian weight function encoded in a strength sub-gene 1011. According to Hebb's rule, a weight strengthens whenever the firing of a pre-synaptic neuron is immediately followed by the firing of a post-synaptic neuron, because the ordering suggests a causal relationship and any such relationships should be reinforced. The weights weaken whenever the firings are not correlated so. For example, if weight values range between one and three, then the weights may increase by 0.2 whenever the amount of time between the pre-synaptic and post-synaptic firings is within a certain number of time intervals (e.g. 5), and decrease by 0.2 whenever the pre-synaptic neuron has been idle for another number of time intervals (e.g. 15).

Another weight function is used in the neural learning system described in my U.S. Pat. No. 6,424,961. This function is also Hebbian, but the size of the weight changes is not constant and follows an increment curve and a decrement curve whose shapes make stable attractors at the endpoints, such that connection weights tend to gravitate around the lowest and highest possible values. When a weight is low, increments are small, and decrements are large, which biases the weights to stay near the bottom. When a weight is high, however, the increments are large and the decrements are small, inclining the weights to stay at the top. Any weight caught in the middle is quickly pulled to one of the attractors, and, once at an attractor, tends to stay at the attractor. Shifting a weight from one attractor to another generally involves repeated and precisely-correlated pre-synaptic and post-synaptic firings or prolonged periods of inactivity.

This weight function stabilizes the operation of the neural system. With most of the weights locked in place, neural pathways cannot be easily disrupted either by noise, degradation, or interaction with other pathways. The weight function can also incorporate positive reinforcement. For example, the positive reinforcement signal PR in one embodiment can be either zero or one. When zero, the positive reinforcement signal PR has no effect. When one, any weights that were about to be strengthened are immediately strengthened all the way to the maximum, reinforcing incipient causal relationships. In this way, a positive reinforcement signal PR can freeze any transient pathway that is currently producing the rewarded behavior.

Figure 13:
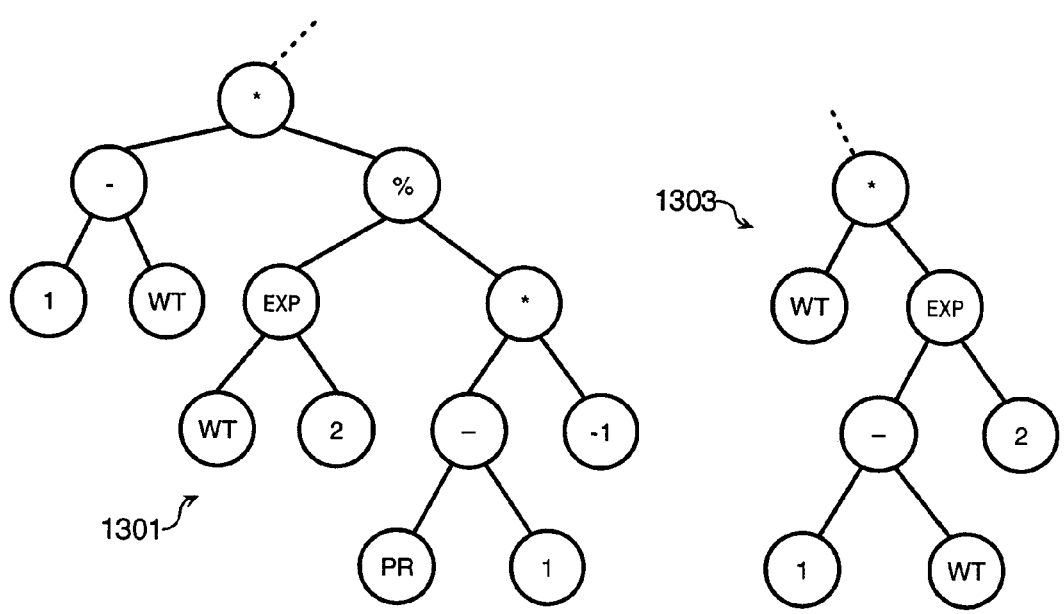
FIG. 13 shows an expression tree for a two-pole Hebbian weight function encoded in a strength sub-gene according to FIG. 10.

These features can be implemented by the two branch clusters shown in FIG. 13. The left cluster 1301 is the part of the weight expression tree that determines how much to increment a weight when strengthening. The right cluster 1303 determines how much to decrement a weight when it needs to be weakened. The rest of the weight expression tree is not shown for purposes of clarity.

There are additional ways to add complexity to the genome, to be even more creative in finding new ways of achieving intelligence. For instance, the genetic codes can be more elaborate, using loops and conditionals in the function sets of their expression trees. Successful branch clusters can be captured and reduced to single nodes so that co-adapted gene fragments can evolve as units. Also, the connection parameter sub-genes can have any number of alleles, specifying much more complex network engineering possibilities than the ten alleles they each had here.

C. Assembly of Neural Systems

Once encoded, a genome is ready for assembling a neural system. In one embodiment, the neural systems self-assemble in a massively parallel chain reaction of neurons creating new connections, creating new neurons, creating new connections, and so on. First, the neural system is seeded with neurons of the type found first in the genome. These constitute the input neurons, and an initial number is constructed as needed by the application for which the neural system is being built. Then, connections are built for the input neurons, using the information specified in the connection genes 1001 that correspond to the input neuron. Specifically, the count sub-gene 1003 specifies the number of connections to build, the direction sub-gene 1005 and the range sub-gene 1007 determine the target area within which to make a new connection, and the target sub-gene 1009 indicates what type of neuron the new connection is to connect with or make. Every new connection selects a preferably random location within that range. If a neuron of the right type is found, then a connection to that neuron is made. If, on the other hand, a neuron of a different type is found, then it selects another location and tries again. If no neuron is found at the location, then it creates a new neuron, of the right type, at that location, and completes the connection. Those connections search the entire target area for a neuron of the right type before giving up and creating a new one.

Every time a new neuron is created, new connections are also created for the new neuron. Some connections link to preexisting neurons; others create new post-synaptic neurons. This chain reaction of neuron creation and connection creation continues until either every new connection is exhausted by connecting to a preexisting neuron or a pre-set limit on the maximum number of neurons is reached. When the neural system is finished, the last neurons created of the last type in the genome are designated as the output neurons.

This brain-building mechanism and genetic code enable the evolution of a wide range of neural circuitry, and many combinations of different circuitries can exist within the same neural system, enabling different regions of the neural system to evolve for separate processing tasks. Neural systems can have different modular components, with different levels of complexity in their interrelationships, just as the neurons themselves can evolve different output functions and types of connections between them. Thus, neural systems are capable of evolving to be as intricate and hierarchically complex as the demands on their intelligence require them to be.

Figure 14:
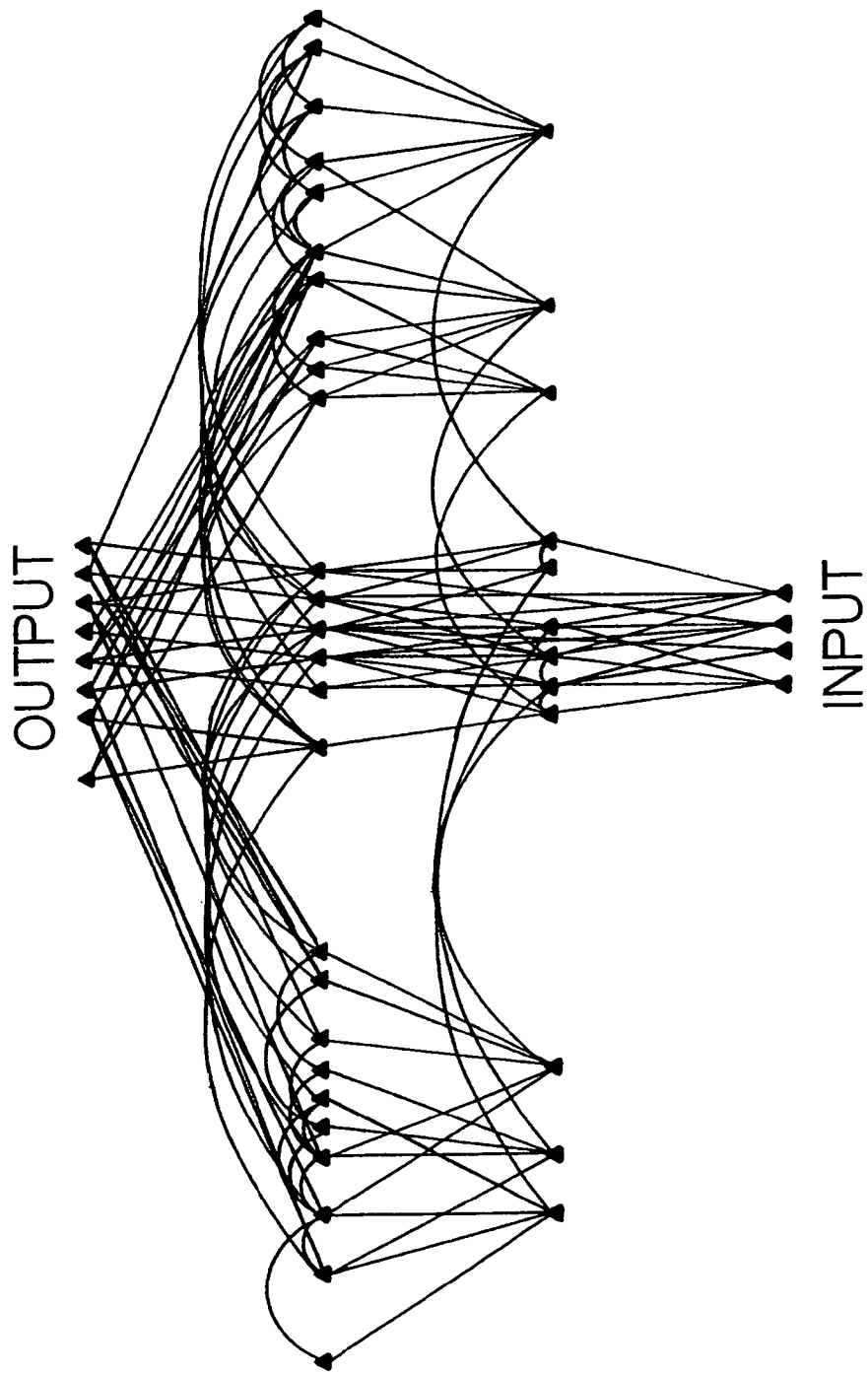
FIG. 14 shows a neural system built from count, direction, range, and target alleles of a genome in accordance with an embodiment shown in FIG. 10.

According to one embodiment, neural systems can grow to any size. FIG. 14 shows a neural system 1401 built from count, direction, range, and target alleles of a genome of six neuron types and eleven connection types. Each neuron type along with its connection types are shown in a different color, and neurons are drawn as triangles and connections as lines between them. The parameter sub-genes of the connection types are given in parentheses (count, direction, range, and target), but the processing genes and strength sub-genes are not shown. The neural system 1401 in the figure began with four neurons and had a maximum limit of fifty. But these numbers are configurable, and the present invention is not limited to any particular number of initial input neurons or any particular growth limit.

Neural systems in accordance with embodiments of the present invention can also grow in any number of dimensions. In FIG. 14, a one-dimensional array of input neurons is shown that produced a two-dimensional network in which every neural layer is a horizontal line. Similarly, an initial two-dimensional array of input neurons can produce a three-dimensional network in which every neural layer is a horizontal plane. In fact, multi-dimensional neural systems are possible, but higher dimensions may be difficult to implement in hardware.

D. Dynamic Circuitry

Another aspect of the present invention pertains to increased flexibility in learning and achieving intelligence, by enabling connections between neurons to be created and destroyed during the operating lifetime of the neural systems. Neural systems in accordance with this aspect of the present invention have the ability to reconfigure their connections, with just two additions to the operator sets of their genetic programs, as shown in TABLE 5:

TABLE 5

| SYMBOL | DYNAMIC OPERATOR |
| --- | --- |
| NEW | y = { 0, new( ) if a = b; 1 if a ≠ b } |
| DIE | y = { 0, die( ) if a = b; 1 if a ≠ b } |

Whenever the NEW operator's input arguments compare equal, that neuron creates new connections. In a processing gene, the NEW operator selectively directs the neuron to make one new connection for each one of its connection types. In a strength sub-gene, the NEW operator selectively directs the neuron to make a new connection only of that sub-gene's type. Each new connection is created according to the rules of connection gene 1101; thus, some of the new connections link to the same neuron as before, some to other neurons, and some to new neurons, which will in turn create new connections, and so forth. Thus, execution of a NEW operator with equal input can initiate a round of self-assembly as described above.

The DIE operator removes neurons and connections from the network. In a processing gene, the entire neuron along with all of its connections is destroyed. In a strength sub-gene, only that sub-gene's connection need be destroyed.

Figure 15:
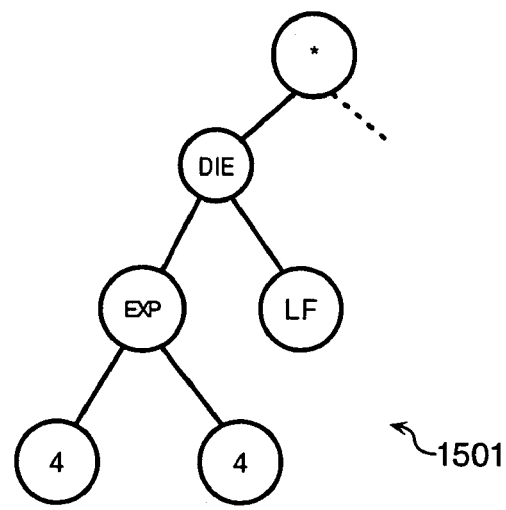
FIG. 15 shows an expression tree for removing neurons.
Figure 16:
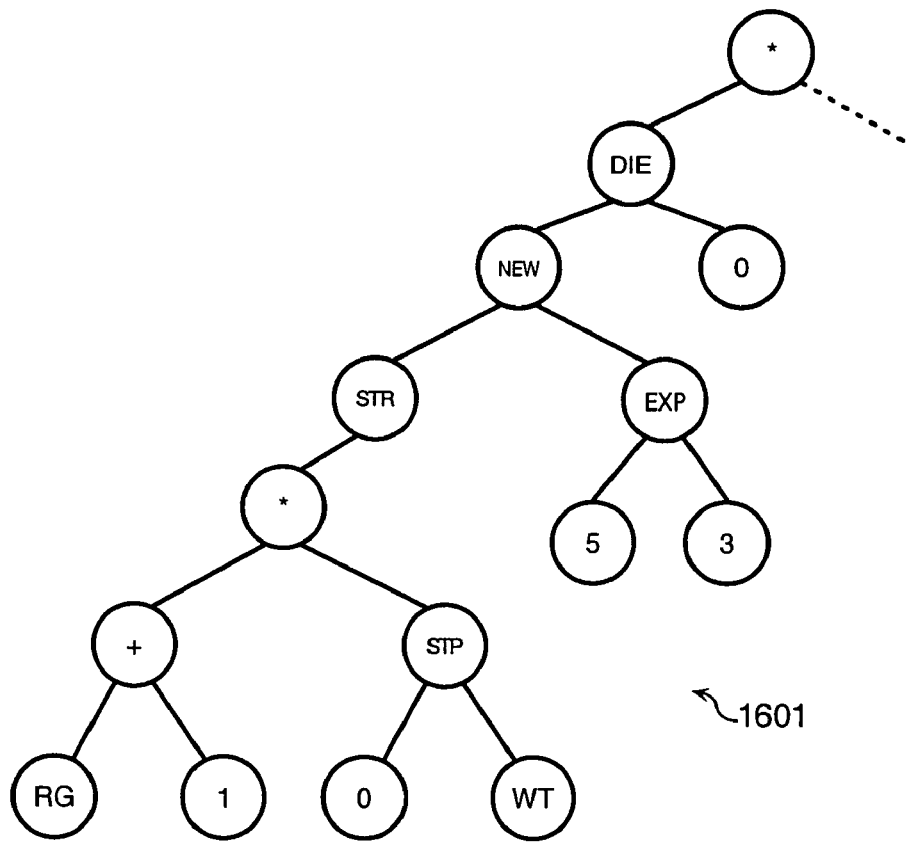
FIG. 16 shows an expression tree for a Hebbian dynamic circuit regeneration function in an embodiment.

The branch clusters in FIGS. 15 and 16 demonstrate these functions in action. The branch 1501 in FIG. 15 is part of a processing gene, and therefore causes the neuron to self-destruct if the neuron is idle for more than 256 time steps, but otherwise has no effect on its output.

FIG. 16, on the other hand, shows a mathematical expression tree 1601 within a strength sub-gene, involving both the NEW and the DIE operators. The weight function implemented by the mathematical expression tree 1601 is Hebbian with a minimum weight of zero. Also after prolonged inactivity, this connection replaces itself and then self-destructs, but here activity is measured not by the frequencies of its pre-synaptic or post-synaptic neuronal firings, but by whether their firings are correlated in a way that suggests the connection is participating in a causal relationship between the two. The register of the mathematical expression tree 1601 increments every time interval but is reset to zero when the weight rises above its minimum value (indicating a Hebbian correlation). If the register reaches 125, then a new connection is created and this connection is destroyed.

Advantageously, neural systems that can replace useless neurons and connections have a higher capacity for learning and memorization. Dynamic creation of circuitry also enables neural systems to evolve neural pathways with intricate feedback mechanisms that automatically rewire their circuitries to meet new perceptual or cognitive demands. In other words, neural systems in accordance with this aspect of the invention are capable of adaptation in response to new situations and environments, just like human brains.

III. Fitness Regimes

Natural selection is about survival of the fittest, and selection in one aspect of the invention is about survival of the smartest. Referring back to FIG. 1, populations of neural systems compete in a series of selection trials (step 103). In each trial the neural systems are trained to do tasks that require some degree of intelligence, and how well each neural system can be trained to perform that task determines whether its genome survives until the next generation. Once the population has evolved to pass the trial, the population moves on to the next one. Each new trial builds a new aspect of intelligence, so with each completed trial the neural systems become more and more intelligent.

What is important in the design of the fitness regimes is that neural systems are not being evolved that can perform certain tasks but rather that can be trained to perform certain tasks. In most artificial evolution projects, on the other hand, every genotype is a candidate solution that is ready to be implemented, and each genotype is selected on the basis of how well the solution works. The neural systems developed according to this aspect of the invention, however, each begin life as a blank slate, needing to be trained before becoming useful but are more versatile and powerful than the rigid structures conventionally produced by artificial evolution.

The methods used for training this neural system can be different from those used for training of conventional artificial neural networks. Artificial neural networks are trained by an elaborate series of calculations that very gradually modify all the internal weights until the network's outputs are correct. These methods have many limitations, the main one being that any artificial neural network that is trained in this manner is not capable of learning anything new. No matter how well the artificial neural networks have been trained, they do not learn from experience nor apply what they have "learned" to new situations.

Training methods for neural systems can be both simpler and more powerful that those employed for conventional artificial neural networks. For example, neural systems can be trained using Skinnerian behavioral conditioning: when an output is desirable a positive reinforcement (PR) signal is sent, and when an output is undesirable a negative reinforcement (NR) signal is sent. These neural systems have access to environmental feedback, and the neural systems most responsive to environmental feedback are those best able to learn, optimize, and maintain a sophisticated repertoire of positive-reinforcement-seeking and negative-reinforcement-avoiding behaviors.

Accordingly, fitness can be measured directly using the formula $$F = \sum_{t \in 0 \ldots T} (PR_t - NR_t)$$

where $PR_t$ and $NR_t$ are the positive and negative reinforcement signals, respectively, received at time step t, and T is the total number of time steps allotted for each brain to master its current trial. The highest scoring genomes are culled at the end of every generation (step 103), and seed the next generation of slightly-more intelligent neural systems via steps 109 and 111. Alternatively, fitness can be measured based on performance in the fitness regime relative to other neural systems.

This kind of reinforcement learning can be used with the neural learning systems described in U.S. Pat. No. 6,424, 961, as mentioned previously. Those neural systems respond to negative reinforcement by temporarily lowering the thresholds of inactive neurons, and to positive reinforcement by raising Hebbian-strengthened weights to their maximum values. This is an efficient and effective training mechanism, but there are other functions for responding to reinforcement, and some of these functions may be better, so it is desired that they be found.

The described evolutionary system can help find better mechanisms. Negative reinforcement and positive reinforcement are important components of the genetic code in the genomes, and the genomes can find different ways of incorporating the components into their calculations. Those calculations that cause their neural systems to better remember behaviors that elicit positive reinforcement and more quickly replace behaviors that elicit negative reinforcement, have a selective advantage. After many generations, the genomes can produce exceptionally well trainable neural systems.

Each genome can periodically be tested for training on its previous trials, helping to ensure that the genomes do not lose their accumulated adaptations. This also means that the same kinds of neural systems have to be trainable in many different environments and must be able to learn to process many different kinds of neural input.

Accordingly, the selection trials described below contain many different types of perceptual problems. Some of the problems can be spatially dynamic, and some can be temporally dynamic. Some can require memorization of the input, and some can require the detailed discrimination of a few critical patterns. Some can require detailed analysis, and some can require rapid decision-making. Successful genomes preferably cope with all of these situations The processing tasks in the selection trials are designed with one feature in common: intelligence. Of course, early trials need not require very much intelligence, but as increasingly more difficult trials are passed, the neural systems become more capable. With each new selective challenge, the neural systems develop more sophistication for making sense of increasingly complex environmental demands. None of these tasks, however, need require brute force computation; that is what conventional computers do well. On the other hand, the tasks performed in the selection trials are to elicit, not brute force, but intelligence, learning to analyze data, identify patterns, draw analogies, predict consequences, and make decisions.

In one deployment, the selection trials are selected from one of three categories: games, control systems, and image analysis. These domains are chosen for at least two reasons. First, they provide challenges with many different skill levels and many different kinds of intellectual requirements, so they are ideal for developing different aspects of intelligence little by little. Second, these domains have commercial value.

Completion of the trials indicates that the neural systems are ready to take the next evolutionary step: the real world. The market can mostly determine selection requirements from then on, and neural systems can evolve to fulfill their needs. By that time, the neural systems are capable of learning new skills that require intelligence.

A. Emulating Artificial Neural Networks

This trial selects for a capability that a conventional artificial neural network can do: memorizing pairs of input and output associations. Specifically, an artificial neural network can be trained to produce a given output in response to a given input so that when the input is later presented to the artificial neural network during its execution phase, the artificial neural network will produce the associated output. Accordingly, this trial develops neural systems that can be trained to emulate artificial neural networks by providing a positive reinforcement signal PR when the output is correct for a particular input and a negative reinforcement signal NR when the output is not correct. Successful neural systems from this trial are those that can evolve a capability to emulate the pattern matching of conventional artificial neural networks.

B. Adaptation

This trial develops the flexibility of neural systems to correct their mistakes, which conventional artificial neural networks cannot do without reprogramming from scratch. To select for this adaptive flexibility, neural systems are first trained to learn a complex combination of associated inputs and outputs as in the artificial neural network emulation trial. Then some of the input-output associates are changed, such that outputs that had previously been positively reinforced now elicit a negative reinforcement signal. That negative reinforcement signal persists until the neural system finds the new output that generates the positive reinforcement signal. In this selection trial, successful neural systems are those that acquire the ability to learn the new answers.

C. Simon

In this trial, neural systems are tested on their ability to be trained in rudiments of understanding time, specifically to remember a series of inputs in a particular order. To select for this ability, the neural systems are made to play Simon, the children's game in which each player takes turns recalling a growing sequence of inputs. The neural systems need not be asked to contribute new entries to the sequence themselves, but they are expected to remember a new input and recall the entire sequence in the correct order on each turn of the game. The positive and negative reinforcement signals are applied according to whether the neural system correctly recites the order of inputs. However, since the neural systems output a sequence of correct outputs and the correct output at any moment is dependent on where it is in the sequence, the learning process involves the ability to handle patterns of relationships among data stored in memory. Successful neural systems for the Simon trial evolve the ability to control the production of a sequence of outputs without requiring continuous input stimuli.

D. Navigation

In the navigation trial, the neural systems learn a simple control system. The input into the neural systems can be a two-dimensional image of the road ahead, a simplified version of what a player sees in a video race car game. The outputs of the neural systems may be virtual actuators that control the steering of a car: move left, go straight, and move right. Accordingly, the neural systems are trained to navigate using negative reinforcement for veering off the road or running into obstacles and positive reinforcement for staying on the road and for not crashing. Since each movement must take into account any approaching obstacles or sharp turns, this trial involves planning. Since the positive or negative reinforcement consequences of each action need not be felt immediately after an action is taken, this trial extends the neural system's understanding of time to comprehend the future so that planning is possible. Therefore, successful neural systems are those that demonstrate an ability to identify future goals and obstacles, taking future needs as well as present needs into account in making decisions.

E. Tetris

This trial builds on the planning capabilities of the evolving neural systems. The input in this trial is a two-dimensional game grid, with the familiar Tetris shapes falling down and accumulating on the bottom, and the output corresponds to one of four shape manipulations: move left, move right, rotate clockwise, or rotate counterclockwise. Negative reinforcement is applied for increasing stack height, and positive reinforcement for clearing rows. To clear the rows and minimize stack height, successful neural systems acquire the ability to develop heuristic strategies, such as favoring gap filling and avoiding burial of open cells. However, the positive or negative reinforcement is not applied for the specific purpose of teaching the neural systems these particular strategies; rather, the neural systems are positively or negatively reinforced only on the merit of their results (e.g. stack height). Just as human players learn for themselves how best to play the game, successful neural systems also learn effective strategies for playing Tetris on their own, without being told specifically what those strategies are. Accordingly, this trial selects for neural systems that have developed the ability to figure out how to solve a given problem without being told beforehand what the steps of the solution are. This is a very important aspect of intelligence beyond the capabilities of conventional artificial neural networks and artificial intelligence.

F. Generalizing Navigation

The ability to generalize what one has learned is an important component of intelligence, which has been famously frustrating for conventional neural models to achieve. Even those neural systems that have passed the previous trials would not necessarily be expected to generalize very well. For example, a successful neural system from the previous trial may have been trained to play proficiently on a ten-by-fifteen sized game grid but exhibit little competence playing on a seven-by-seventeen game grid. This slight change in the size of the playing surface would hardly present much of a conceptual difficulty to a human child but would incapacitate conventional artificial intelligence systems. Accordingly, in this trial, the ability to generalize is selected for so that successful neural systems become proficient at unforeseen variants of a given trial.

One approach is to lay a foundation for generalization by beginning with a trial that is somewhat easier than Tetris: navigation. In the generalizing navigation trial, neural systems are created with a large two-dimensional array of input neurons, the size of the playing surface and the subset of the input neuron space that contribute to the neural systems' perception of the virtual world changes from one round of training to the next. The neural systems are tested for their ability to navigate through game grids of multiple sizes and with variously sized and located subset of their input neurons. Generalization in this task involves learning to avoid the edges of the road and avoid obstacles in the road, regardless of how wide or how deep their perceptual field extends. In the next trial, Tetris is generalized.

G. Generalizing Tetris

The ability to generalize playing the game of Tetris over various sizes of the playing field is more sophisticated than the ability to pass the generalizing navigation trial, since the dynamics of Tetris are more drastically altered than the dynamics for navigation. As in the generalizing navigation trial, each neural system is tested on different sized playing surfaces and subsets of its neural input space. To become competent Tetris players for any size game grid, neural systems learn to identify fairly complex patterns regardless of where they may be found within their perceptual field, so successful neural systems from this trial demonstrate an ability to generalize, making sense of complex and dynamic patterns of data.

H. Scheduling Elevators

This trial has a real world application: determining an efficient passenger pickup and drop-off scheduling for a bank of elevators in a high-traffic building. However, designing a control system to manage this task is surprisingly difficult, especially considering that each elevator operator only really has to make two decisions: (1) whether to stop at an approaching floor that has a pickup request, and (2) where to go when there are no requests. Other aspects of the elevator's behavior can be governed by rules that dictate, for example, that an elevator should not reverse direction if there are drop-off requests in the current direction or should not respond to pickup requests if the elevator is too full. Artificial intelligence researchers have had a long interest in elevator scheduling and they have developed many algorithms that range from simple heuristics to very complex strategies that require elaborate statistical calculations.

Every scheduling algorithm, however, faces the following problem: while an elevator scheduling system might work well for a particular pattern of passenger traffic, that scheduling system might not work as well when the passenger traffic patterns change. If fact, changes in passenger traffic are common. In the morning, most passengers in an office building travel from the lobby to the higher floors, while in the evening the traffic is reversed. Another building might be home to companies that span multiple floors, exhibiting patterns of inter-floor traffic that change as companies come and go. An intelligent elevator scheduler should be able to optimize itself in response to these kinds of changes.

In this trial, neural systems are evolved that can be trained to optimize elevator scheduling for unforeseen traffic patterns and to readjust the scheduling as the traffic patterns change, ensuring that the elevator scheduling remains optimal. The negative and positive feedback for training can be straightforward, since there are two easily quantified measures of performance: the time between pickup request and pickup, and the time between pickup and drop-off. Accordingly, negative reinforcement is applied for increases in these times, and positive reinforcement for reductions. Successful neural systems are those that can be trained like this to continually optimize elevator service and are useful in large buildings.

I. Scheduling Traffic Signals

Many cities have centrally managed traffic signal systems that coordinate traffic lights on city blocks to keep traffic moving freely. To help city planners optimize the timing of the traffic signals, software packages have been developed that can simulate traffic flow under different schedules, and the planners use the software to experiment with different timing patters to find one suited to their streets. However, traffic patterns are always subject to change due to weather, the time of day, day of week, local events, economy, and road construction in the short term as well as longer term changes in population, living preferences, and work habits. There are too many unpredictable variables for pre-coded traffic management systems to work well without constant reprogramming. An intelligent scheduler, on the other hand, is expected to constantly learn how to improve traffic flow when the traffic patterns change, developing new solutions if necessary.

In this trial, the neural systems are evolved to be able to be trained to do exactly this. Their training can be accomplished by applying positive and negative reinforcement in proportion to how often cars pass through green lights and the amount of time the cars are stopped at red lights. In virtual simulations, the idle time of every car on the road can be measured. In real practice, data collection sensors can be placed in taxicabs, buses, and other city-owned vehicles. With this constant stream of data, the neural system can manage the traffic signals in a truly intelligent way. Having been bred for the ability to adapt since the second trial, the neural systems are now are being trained to adapt spontaneously to complicated conditions. As a result, the neural systems demonstrate the ability to find good solutions to complex problems never before seen.

J. Captcha

Several of the previously described trials involve developing neural systems that are capable of identifying fairly complex patterns in their perceptual fields. In this trial, the neural systems evolve to outwit a CAPTCHA (a "Completely Automatic Public Turing test to tell Computers and Humans Apart"). CAPTCHAs are tests designed to verify whether a user on the other end of a network connection is actually a human, which is useful for preventing the harvesting of email address for spammers by automated scripts. One form of a CAPTCHA displays a randomly distorted string of random text and requests the user to read the distorted text. While humans can read these letters easily, current computer programs cannot. The CAPTCHA Project, which develops these tests, has challenged the artificial intelligence community to design an artificial agent that can read randomized text generated on their web site at greater than 80% accuracy. This trial develops neural systems that have acquired an image processing capability advanced enough to meet the CAPTCHA challenge.

K. Additional Trials

Additional trials can be employed as steps on the path to intelligence, with objectives that are trainable and practical. For example, one objective is the ability to learn when the consequences (i.e. positive and negative reinforcement) of a given action are not felt until much later. All of the trials starting with navigating have this to some extent, but the delay between action and consequence is fairly small. In most real games, like checkers, go, connect four, or dots and boxes, a given move might be very good or very bad, but the very good or very bad results might not be manifest for a very long time. Accordingly, games can be used as selection trials to develop this ability, but so too can control systems, which may be more marketable.

Another objective is a detailed and patterned long-term memory, building on the Simon trial in which memories first started to be interrelated. One trial to further this objective is to train neural systems to learn how to navigate a maze and remember the maze. Bumping into a wall elicits negative reinforcement; and there can be positive reinforcement for different kinds of rewards located at different corners of the maze. The neural systems would have an input indicator that correlates with a negative reinforcement signal, much like thirst or hunger, and each of the different rewards in the maze relieve the negative reinforcement from the respective indicator. Thus, each time a neural system feels the input indicator, the neural system learns to go directly to the location of that reward.

IV. Solving the Inverted Pendulum Problem

One embodiment of the present invention can be used to solve the famous inverted pendulum problem in engineering. In the classic one-dimensional version of this problem, a pendulum hinged to a wheeled cart is to be balanced upright by jostling the cart from side to side. This system is highly dynamic and nonlinear. The system is also very unstable. One miscue and the pendulum will come crashing down.

This problem is also more than just an academic exercise in control theory. Inverted pendulum-like problems are found in applications as diverse as robotics, SEGWAY™ Human Transporters, and offshore drilling platforms. A version of this problem is even found in rocket science: when a rocket launches into the sky, the rocket has to be kept precisely balanced on top of its thrust vector or it will tumble out of control. Some of the solutions are very sophisticated. The space shuttle's vector control system monitors the ship's position and, if necessary, fires corrective bursts from a set of gimbaled thrusters, once every twenty milliseconds during the entire ascent.

Control theorists have developed many different kinds of inverted pendulum solutions, using traditional engineering algorithms, genetic algorithms, fuzzy logic systems, expert systems, and artificial neural networks. All of these methods work well, with one important limitation: any solutions generated by them can only work for a very specific set of problem conditions. If some aspect of the problem changes, a new solution must be generated based on the new parameters. The solutions neither learn from experience nor apply what they've learned to new situations.

For example, an inverted pendulum application may suddenly be tasked with balancing a different mass, or length, or be placed on an incline, or it may encounter sustained gusts of wind, or friction on the ground or in the hinge, or obstacles in its way. Any number of new situations might arise, including wear and tear in the parts of the controlling mechanism itself, and every one of the methods mentioned above would likely fail. An intelligent controller should be able to cope with change.

Neural systems evolved for intelligence by embodiments of the invention do not stop learning and are ready for anything new. The inverted pendulum trials develop this capability, and in the context of a complex task. The first few trials are very simplified virtual versions of the problem. Later versions become increasingly difficult and increasingly dynamic. Neural systems that can pass these trials demonstrate a fundamental aspect of intelligent behavior, applied in a very useful way.

A. Inverted Pendulum Trial One

The first goal is to breed neural systems that respond to positive and negative reinforcement. The reinforcement signals used to train the neural systems to master a simplified version of the inverted pendulum problem are summarized in TABLE 6:

TABLE 6

| | OUTPUT | | |
|---|---|---|---|
| INPUT | <0 | 0 | >0 |
| 10 | P | N | N |
| 01 | N | N | P |

Each neural system has two input neurons: one left and one right. At any instant, the value of those inputs will indicate the direction the pendulum is leaning: a 1 on the left means it is leaning left, a 1 on the right means it is leaning right. The output neuron will indicate which way the neural system wants to move the cart: any value less than zero means push left, any value greater than zero means push right. These assignments may be changed around fairly often to make sure neural systems are not evolved that can only learn this specific table. The entries in the table indicate which reinforcement signals are sent to the neural system as a result of its actions: a P means positive (PR=1 and NR=0), an N means negative (PR=0 and NR=1).

As with other selection trials, the neural systems that remember actions that generate positive reinforcement and avoid actions that generate negative reinforcement are the ones selected at the end of generation. These are the neural systems that best know how to learn.

B. Inverted Pendulum Trial Two

In this trial a new factor is introduced for the neural systems to take into consideration: the angular velocity of the pendulum. Deciding how to move the cart now involves determining the magnitude of the push in addition to the direction of the push. This trial, therefore, is more complicated than the previous trial.

The neural systems have two input neurons for this trial, one for the pendulum's angle and one for its velocity, and their outputs will be interpreted as before (less than zero means push one way, greater than zero means push the other).

The trial has two parts. For the first few generations, the inputs only have three possible values. When the neural systems have mastered this many, the number will increase, e.g., to five. When the neural systems push to keep the pendulum centered, they receive positive reinforcement; but if they push the wrong way, the pendulum will drop and they receive negative reinforcement. The calculations generated for a table of data for this trial can based on a set of standard test parameters used by control theorists to gauge the quality of their inverted pendulum controllers.

C. Inverted Pendulum Trial Three

From this trial onwards, the input values can be any number within the problem domain; no longer just two, three, or five possibilities but the precise pendulum angle and angular velocity. This trial also has a different reinforcement regime. In the first two trials the neural systems were conditioned based on their actions, but from this trial on the neural systems are conditioned based on the results of their actions, namely how well the pendulum is kept in balance. Positive reinforcement is given whenever the vertical angle is less than three degrees, and then in relation to the pendulum's proximity to the apex. Negative reinforcement is given whenever the angle is greater than three degrees, and then in relation to the pendulum's distance from the apex. At first the pendulum is constrained from swinging more than fifteen degrees to either side, but as the neural systems get collectively smarter, the constraints are relaxed and conditions are made increasingly difficult.

D. Inverted Pendulum Trial Four

In this trial, two additional input neurons are used: one for the cart position, and one for the cart velocity. These inputs, together with pendulum angle and pendulum velocity, provide each neural system with the full state of the pendulum to control. The cart position is important because, starting with this trial, limits are placed on the track: the carts cannot be pushed past 2.4 meters to either side of the track center. (2.4 meters being the standard track limit used for inverted pendulum benchmarks.) Because of the boundaries, there are times when the correct action given the position and velocity of the pendulum might not be possible given the position and velocity of the cart. Successful neural systems are those trainable for planning their actions.

E. Inverted Pendulum Trial Five

With this trial the neural systems become competitive with the state of the art, but they need to learn one more trick: from now on, they are to keep the cart as close as possible to the center of the track. So there are two objectives: centering the pendulum on the cart and centering the cart on the track, and both objectives and all four variables must be kept in mind when deciding what to do.

With two objectives, there are two reinforcement regimes. This means that at times the brains will receive positive reinforcement for success at one of the objectives concurrently with negative reinforcement for failure at the other. And with success or failure at both, the two signals are summed together. The sum of each type of signal may range between zero and one (for consistency from trial to trial), but within that constraint the reinforcement can be apportioned in any way. An off-center pendulum may be considered worse than an off-center cart, since the pendulum is more difficult to rectify. So negative reinforcement is applied more strongly for the pendulum angle than for the cart position.

After mastering this trial, the neural systems are put though standard inverted pendulum benchmark tests, with qualitative and quantitative measures of performance. Of course, these benchmarks do not test for learning how to respond to changing problem conditions, because none of the existing solutions can do that. This is what the next trial is for, and where dramatic improvement over other types of controllers lies.

F. Inverted Pendulum Trial Six

In this trial, neural systems learn to control the actuator circuits regulating the robotic manipulator arm of a simulated future version of NASA's Near-Earth Asteroid Rendezvous mission. The neural systems are tested on handling all sorts of changing conditions, from changes in pendulum length (as the robot extends and contracts its arm), mass (when the arm grabs objects of different weights), roving environment (as it encounters obstacles and hills), and gravity intensity (when exploring different asteroids or flying through space). An occasional solar flare or flying neutrino may cause a short circuit in some part of the mechanical arm and cause the actuators to behave erratically.

The neural systems have access to four streams of information: the pendulum angle, the pendulum velocity, the cart position, and the cart velocity, plus positive and negative reinforcement feedback. When something is not working right, the neural systems know it and what to do about it.

More trials can be designed. There are many possibilities. For example, reinforcement signals can be provided only for complete success or total failure, anything in between and the neural systems do not have any feedback; or, some of the input such as the angular velocity and cart velocity data, can be withheld, requiring neural systems to infer their values by monitoring how the angle and cart positions change over time. They can also be trained to apply variable forces to the cart, instead of always applying all-or-nothing.

V. Computational Modeling

The computational resources required for developing artificial intelligence can be enormous. With tens of thousands of individual genomes, each with dozens of genes and sub-genes, selected for thousands of generations, the artificial world may overburden even a state of the art supercomputer.

The problem is even worse if there is more than one independently evolving population. Nevertheless, there are several good reasons for doing so. First, there is greater genotypic diversity with many different populations, each population finding different genetic solutions to the selection trials. When the training is over, and members of the highly evolved populations are chosen for their final specializations, some genetic combinations may turn out to work better than others at certain tasks. Every additional population significantly increases the reservoir of genetic diversity from which to choose those best suited to particular problems.

Furthermore, all these archetypes of intelligent, neural systems provide an exciting opportunity to study the neural basis of intelligence. Today's neuro-anatomists have exactly one working model of an intelligent brain (i.e. the human brain), and with its jumbled mess of complex neural circuitry, some of which may be an artifact of evolution, scientists are not much closer to understanding what makes us intelligent than the Golgi stainers of over a hundred years ago. But with many working models, each realizing intelligence its own way, comparative neuro-anatomists can finally perform inductive science. Every additional population means many additional clues in the search for the commonalities of intelligence.

To address the computational issues, the evolutionary world can be mounted onto a distributed grid, with thousands of computers employed on the project at the same time. Fortunately, some aspects of the invention are particularly suited for parallel multitasking, for example, using toolkits from the Globus Project. With automation of the evolutionary process and selection trials, batches of new genomes and their trials are farmed out to idle computers sitting on the grid. As results come pouring in, new batches are distributed back out in a secure environment to preserve intellectual property. With distributed computation, a vast virtual world of evolving populations, adapting and multiplying in computers distributed all over the earth, can be created and managed from a single desktop.

Alternatively, the virtual evolutionary world can be mounted onto a homegrown Beowulf cluster, which is a distributed grid of computers harnessed together under one roof. Enormous supercomputing power has been realized from the pooled collections of several dozen discarded, obsolete PCs, which are available in bulk from resellers for as low as sixty dollars apiece. While the computers may be slower, they are dedicated full time, and packets need only travel over a few yards of Ethernet™ instead of through unsecured depths of the Internet.

Figure 17:
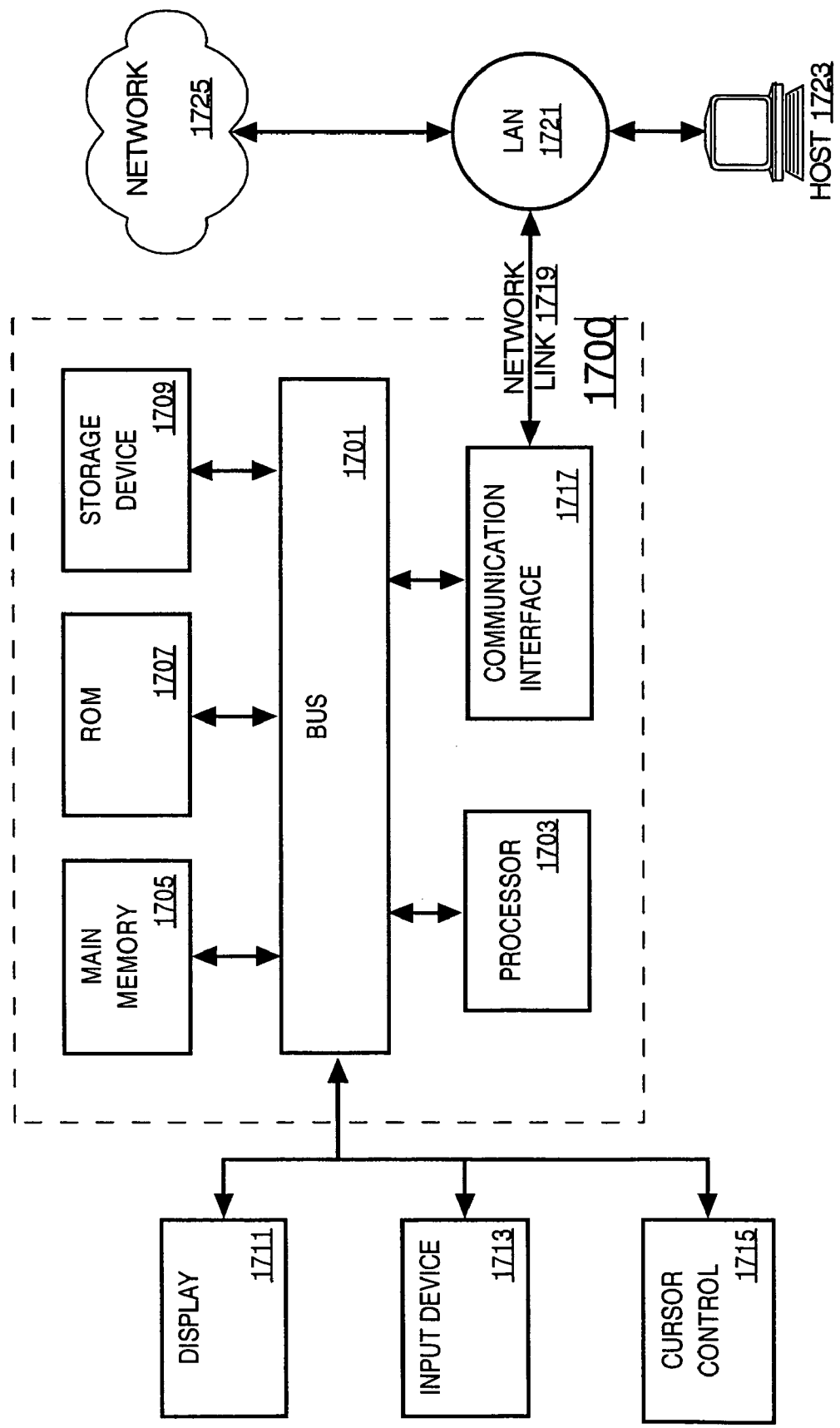
FIG. 17 depicts a computer system that can be used to implement an embodiment of the present invention.
Figure 18:
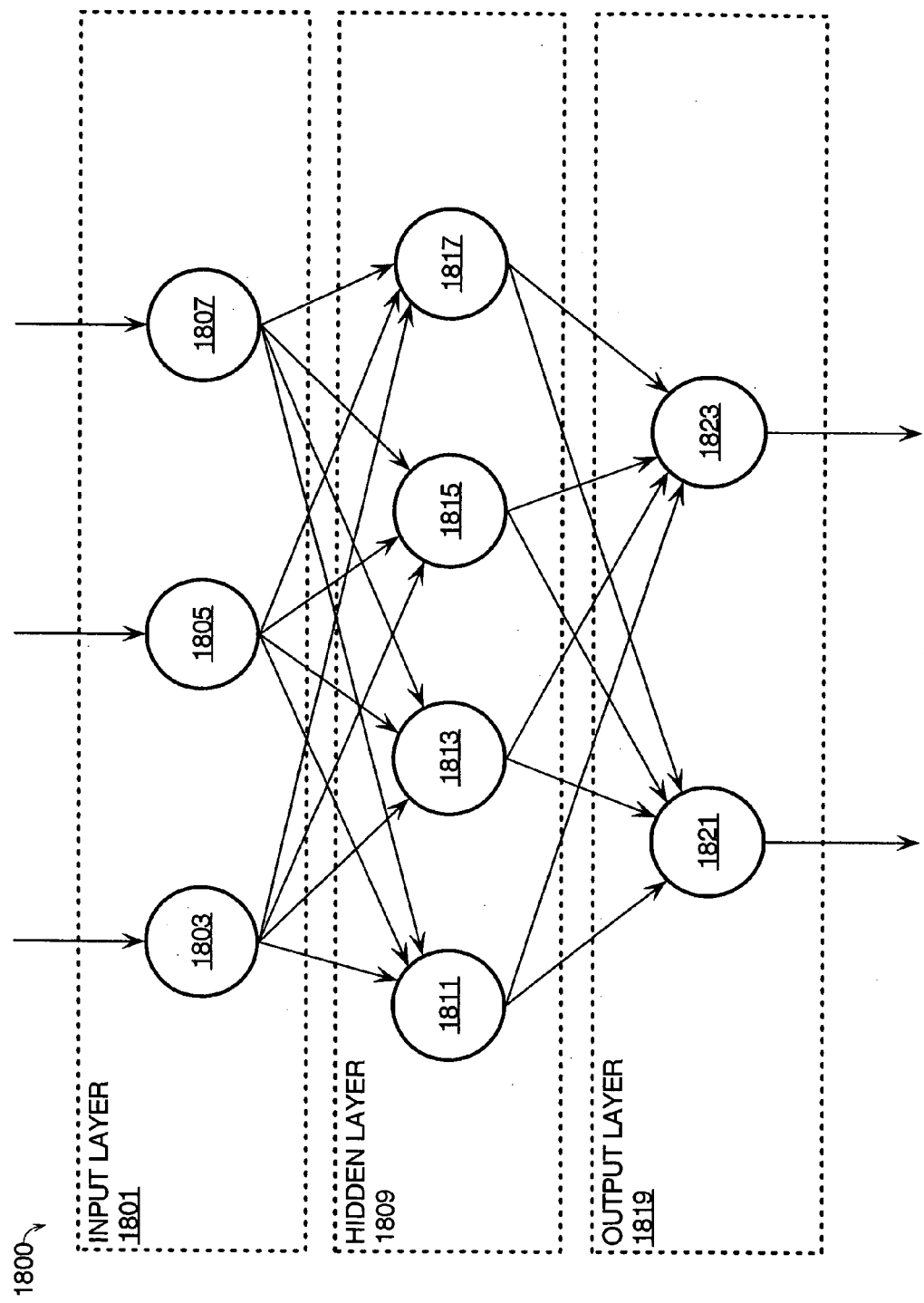
FIG. 18 is a drawing of a conventional artificial neural network.

FIG. 17 illustrates a computer system 1700 upon which an embodiment according to the present invention can be implemented either standalone or as one computer in a multi-computer gird or cluster. The computer system 1700 includes a bus 1701 or other communication mechanism for communicating information and a processor 1703 coupled to the bus 1701 for processing information. The computer system 1700 also includes main memory 1705, such as a random access memory (RAM) or other dynamic storage device, coupled to the bus 1701 for storing information and instructions to be executed by the processor 1703. Main memory 1705 can also be used for storing temporary variables or other intermediate information during execution of instructions by the processor 1703. The computer system 1700 may further include a read only memory (ROM) 1707 or other static storage device coupled to the bus 1701 for storing static information and instructions for the processor 1703. A storage device 1709, such as a magnetic disk or optical disk, is coupled to the bus 1701 for persistently storing information and instructions.

The computer system 1700 may be coupled via the bus 1701 to a display 1711, such as a cathode ray tube (CRT), liquid crystal display, active matrix display, or plasma display, for displaying information to a computer user. An input device 1713, such as a keyboard including alphanumeric and other keys, is coupled to the bus 1701 for communicating information and command selections to the processor 1703. Another type of user input device is a cursor control 1715, such as a mouse, a trackball, or cursor direction keys, for communicating direction information and command selections to the processor 1703 and for controlling cursor movement on the display 1711.

According to one embodiment of the invention, developing artificial intelligence is provided by the computer system 1700 in response to the processor 1703 executing an arrangement of instructions contained in main memory 1705. Such instructions can be read into main memory 1705 from another computer-readable medium, such as the storage device 1709. Execution of the arrangement of instructions contained in main memory 1705 causes the processor 1703 to perform the process steps described herein. One or more processors in a multi-processing arrangement may also be employed to execute the instructions contained in main memory 1705. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 1700 also includes a communication interface 1717 coupled to bus 1701. The communication interface 1717 provides a two-way data communication coupling to a network link 1719 connected to a local network 1721. For example, the communication interface 1717 may be a digital subscriber line (DSL) card or modem, an integrated services digital network (ISDN) card, a cable modem, a telephone modem, or any other communication interface to provide a data communication connection to a corresponding type of communication line. As another example, communication interface 1717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1717 sends and receives electrical, electromagnetic, or optical signals that carry digital data streams representing various types of information. Further, the communication interface 1717 can include peripheral interface devices, such as a Universal Serial Bus (USB) interface, a PCMCIA (Personal Computer Memory Card International Association) interface, etc. Although a single communication interface 1717 is depicted in FIG. 17, multiple communication interfaces can also be employed.

The network link 1719 typically provides data communication through one or more networks to other data devices. For example, the network link 1719 may provide a connection through local network 1721 to a host computer 1723, which has connectivity to a network 1725 (e.g. a wide area network (WAN) or the global packet data communication network now commonly referred to as the "Internet") or to data equipment operated by a service provider. The local network 1721 and the network 1725 both use electrical, electromagnetic, or optical signals to convey information and instructions. The signals through the various networks and the signals on the network link 1719 and through the communication interface 1717, which communicate digital data with the computer system 1700, are exemplary forms of carrier waves bearing the information and instructions.

The computer system 1700 can send messages and receive data, including program code, through the network(s), the network link 1719, and the communication interface 1717. In the Internet example, a server (not shown) might transmit requested code belonging to an application program for implementing an embodiment of the present invention through the network 1725, the local network 1721 and the communication interface 1717. The processor 1703 may execute the transmitted code while being received and/or store the code in the storage device 1709, or other non-volatile storage for later execution. In this manner, the computer system 1700 may obtain application code in the form of a carrier wave.

The term "computer-readable medium" as used herein refers to any medium that participates in providing instructions to the processor 1703 for execution. Such a medium may take many forms, including but not limited to non-volatile media, volatile media, and transmission media. Non-volatile media include, for example, optical or magnetic disks, such as the storage device 1709. Volatile media include dynamic memory, such as main memory 1705. Transmission media include coaxial cables, copper wire and fiber optics, including the wires that comprise the bus 1701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for encoding a specified neural system into a representative genome, wherein the neural system comprises an array of interconnected neurons and each neuron has an input and an output, said method comprising the steps of:

for a given neuron, encoding a specification of a conversion of neuron input to neuron output by a processing gene corresponding to the given neuron;

encoding connections from the given neuron by one or more connection genes, each corresponding to the given neuron; and selectively ordering processing genes and connection genes corresponding to respective neurons of the neural system to form said genome.

2. The method of claim 1, wherein:

said genome includes different types of processing genes and further includes different types of connection genes, each type of processing gene encoding a different type of neuron, and each type of connection gene encoding a different type of interaction between neurons.

3. The method of claim 2, wherein:

a processing gene encodes a neural output function for its corresponding neuron, wherein the encoded neural output function provides neuron output as a specified function of collective neuron inputs.

4. The method of claim 3, wherein:

a neural output function encoded in a processing gene is encoded in the form of a mathematical expression tree having internal nodes and leaf nodes, said internal nodes representing a set of mathematical operators, and said leaf nodes representing a set of terminal inputs to said mathematical expression tree.

5. The method of claim 3, wherein:

each of said connection genes is subdivided into a specified number of components, each component comprising a functional capability.

6. The method of claim 5, wherein:
one of said components comprises a strength sub-gene encoding a weight function that determines the weight of a corresponding connection.

7. The method of claim 6, wherein:
said strength sub-gene is represented by a mathematical expression tree having an associated set of operators.

8. The method of claim 7, wherein:
at least one of said operator sets includes one or more operators for enabling the neural system to reconfigure its neuron connections.

9. The method of claim 8, wherein:
said operators for reconfiguring connections comprise a first operator for creating new neuron connections, and a second operator for removing neurons and neuron connections.

10. The method of claim 9, wherein:
a first operator in a processing gene selectively directs a neuron to make one new connection for each one of its connection types, and a first operator in a strength sub-gene selectively directs a neuron to make a new connection only of that sub-gene's type.

11. The method of claim 9, wherein:
a second operator in a processing gene removes neurons and connections from the neural system, and a second operator in a strength sub-gene removes only that sub-gene's connection.

12. The method of claim 7, wherein:
a processing gene and a strength sub-gene each encodes an output function having a specified form and corresponding inputs, at least one of said output functions being responsive to positive reinforcement and negative reinforcement signals applied to its corresponding inputs for use in selectively training said neural system.

13. The method of claim 2, wherein:
said method includes the step of performing mutation operations on selected processing genes and selected connection genes.

14. The method of claim 13, wherein:
a group of genes of said genome can be exchanged with a group of genes of another genome that likewise comprises processing genes and connection genes.

15. The method of claim 2, wherein:
each of said connection genes encodes the location of a neuron connection to another neuron, and further encodes a weight associated with the connection.

16. The method of claim 15, wherein:
each of said connection genes can be mutated.

17. The method of claim 2, wherein:
each of said connection genes includes a plurality of parameter sub-genes, each parameter sub-gene disposed to encode either a specified value, or a mathematical expression tree, selectively.

18. The method of claim 17, wherein:
one of said parameter sub-genes comprises a count sub-gene, said count sub-gene specifying the number of connections of each type made by each type of neuron.

19. The method of claim 17, wherein:
said parameter sub-genes include direction and range sub-genes that collectively determine where each connection to a neuron goes.

20. The method of claim 17, wherein:
one of said parameter sub-genes comprises a target sub-gene indicating the kinds of neurons that respective connections are to link with.

21. The method of claim 17, wherein:
said method includes the step of mutating said sub-genes, selectively, of said connection genes.

22. A method for building a neural system for use in a specified application, said method comprising the steps of:
encoding a genome to represent one or more types of neurons in an array, and to further represent one or more types of interactions between said neurons;
inserting said neurons encoded in said genome into said neural system as input neurons, an initial number of said input neurons being determined at least in part by said application;
selectively building connections between respective input neurons; and
selectively creating new neurons.

23. The method of claim 22, wherein:
each neuron represented by said genome has a neural output function encoded by a processing gene, wherein different types of neurons are respectively encoded by different types of processing genes; and
each of said interactions between neurons is encoded by a connection gene, wherein different types of interactions are respectively encoded by different types of connection genes.

24. The method of claim 22, wherein:
said encoded representation of one or more types of interactions between said neurons specifies the number of connections to build, determines a target area in which a connection is to be made, and indicates the type of neuron that a connection is to be made to.

25. The method of claim 24, wherein building a neuron connection comprises:
selecting a first location within a specified target area;
forming a connection with a neuron found at said first location, if the found neuron is of a specified type;
selecting a second location to search for a neuron, if a neuron found at said first location is not of said specified type; and
creating a neuron of said specified type at said first location, if no neuron can be found at said first location.

26. The method of claim 25, wherein:
said encoded representation of said interaction between said neurons selectively specifies one or more conditions selected from a group, said group including the conditions that a neuron of said specified type is created only if a pre-existing neuron of said specified type cannot be found anywhere in said specified target area; a connection to a pre-existing neuron of said specified type is made only if empty spaces in which to create new neurons cannot be found anywhere in said specified target area; creation of new neurons is not allowed; and connections to pre-existing neurons are not allowed.

27. The method of claim 26, wherein:
creation of a new neuron requires creation of one or more new connections therefor, said new connections either linking to previously existing neurons or creating new post-synaptic neurons; and
said connection creation process continues until every new connection is either made to a previously existing neuron, or a pre-set limit on the maximum number of neurons in the neural system is reached.

28. The method of claim 27, wherein:
upon completion of said neural system, a set of the last neurons to be created are designated as output neurons.

29. The method of claim 28, wherein:
said neural system contains a substantial number of different circuitry combinations.

30. The method of claim 29, wherein:
said neural system comprises an array having a specified number of dimensions.

31. A method for developing a neural system adapted to perform a specified task, said method comprising the steps of:
selecting a population of neural systems, each neural system comprising an array of interconnected neurons;
encoding each neural system into a representative genome, wherein the genome for a given neural system encodes a neural output function for each neuron in a corresponding processing gene, and encodes connections from each neuron in one or more corresponding connection genes, each connection gene including a weight function;
operating said given neural system to perform said specified task during a trial period;
continually monitoring performance of said given neural system during said trial period;
applying reinforcement signals determined from said continually monitored performance as inputs to the neural output function of each processing gene of said given neural system, and also as inputs to the weight function of each connection gene thereof; and
determining a fitness of said given neural system for performing said specified task after a conclusion of said trial period.

32. The method of claim 31, wherein:
said reinforcement signals include a positive reinforcement signal $PR_t$ and a negative reinforcement signal $NR_t$ received at a time step t included in a total number of time steps T.

33. The method of claim 32, wherein:
the fitness F of said given neural system for performing said specified task is determined from the relationship:

$$F = \sum_{t \in 0 \ldots T} (PR_t - NR_t).$$

34. The method of claim 33, wherein:
a set of said genomes, respectively representing the neural systems of said population determined to have the highest fitness values, are selected for use in forming a new generation of neural systems.

35. The method of claim 33, wherein each genome is subjected to a succession of selection trials, and is periodically tested to detect loss of previous adaptations.

36. The method of claim 35, wherein:
each of said selection trials is disposed to develop characteristics associated with intelligence.

37. A computer system for encoding a specified neural system into a representative genome, wherein the neural system comprises an array of interconnected neurons and each neuron has an input and an output, said computer system comprising:
one or more processors; and
a computer readable medium connected to the processors, said computer readable medium including processor instructions configured to be read by said processors and thereby cause said processors to:
for a given neuron, encode a specification of a conversion of neuron input to neuron output by a processing gene corresponding to the given neuron;
encode connections from the given neuron by one or more connection genes, each corresponding to the given neuron; and
selectively order the processing gene and connection gene corresponding to respective neurons of the neural system to form said genome.

38. The computer system of claim 37, wherein:
said genome includes different types of processing genes and further includes different types of connection genes, each type of processing gene encoding a different type of neuron, and each type of connection gene encoding a different type of interaction between neurons.

39. The computer system of claim 38, wherein:
a processing gene encodes a neural output function for its corresponding neuron, wherein the encoded neural output function provides neuron output as a specified function of collective neuron inputs.

40. The computer system of claim 38, wherein:
said method includes the step of performing mutation operations on selected processing genes and selected connection genes.

* * * * *